United States Patent
Chen et al.

(10) Patent No.: US 11,178,097 B2
(45) Date of Patent: Nov. 16, 2021

(54) USER EVENT RESPONDING METHOD AND APPARATUS

(71) Applicant: Tencent Technology (Shenzhen) Company Limited, Shenzhen (CN)

(72) Inventors: Hao Chen, Shenzhen (CN); Maowei Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 344 days.

(21) Appl. No.: 15/663,272

(22) Filed: Jul. 28, 2017

(65) Prior Publication Data
US 2017/0331779 A1    Nov. 16, 2017

(30) Foreign Application Priority Data
Feb. 13, 2015    (CN) .................... 201510076987.X

(51) Int. Cl.
*H04L 12/58*    (2006.01)
*H04L 29/08*    (2006.01)
(Continued)

(52) U.S. Cl.
CPC .............. *H04L 51/32* (2013.01); *G06Q 10/00* (2013.01); *G06Q 10/10* (2013.01); *G06Q 10/107* (2013.01);
(Continued)

(58) Field of Classification Search
CPC ....... H04L 29/08; H04L 51/32; H04L 67/306; H04L 51/02; G06Q 10/00; G06Q 50/01
See application file for complete search history.

(56) References Cited

U.S. PATENT DOCUMENTS

| | | | |
|---|---|---|---|
| 8,380,803 B1 * | 2/2013 | Stibel ................. | G06Q 30/0255 705/319 |
| 8,943,145 B1 * | 1/2015 | Peters ................... | G06Q 50/01 709/206 |

(Continued)

FOREIGN PATENT DOCUMENTS

| | | |
|---|---|---|
| CN | 101247366 A | 8/2008 |
| CN | 103001926 A | 3/2013 |

(Continued)

OTHER PUBLICATIONS

Tencent Technology, ISRWO, PCT/CN2016/072136, Apr. 25, 2016, 10 pgs.

(Continued)

*Primary Examiner* — Esther B. Henderson
(74) *Attorney, Agent, or Firm* — Morgan, Lewis & Bockius LLP

(57) ABSTRACT

The present disclosure discloses a user event responding method performed by a computer server hosting a social networking application involving a user account associated with a terminal and a public identifier associated with a third-party service account, including: receiving a subscription request from the terminal; establishing a subscription relationship between the user account and the third-party service account; configuring a set of auto-response rules for the subscription relationship in accordance with one or more parameters provided by the user account and the third-party service account, respectively; detecting a user event triggered by the user account at the terminal; identifying one or more keywords associated with the user event; obtaining, according to the set of auto-response rules, a response message corresponding to the detected user event and determined by the one or more keywords; and returning the (Continued)

obtained response message to the user account for display on the terminal.

18 Claims, 5 Drawing Sheets

(51) Int. Cl.
  *G06Q 50/00* (2012.01)
  *G06Q 10/00* (2012.01)
  *G06Q 10/10* (2012.01)
  *H04W 4/08* (2009.01)

(52) U.S. Cl.
  CPC .............. *G06Q 50/01* (2013.01); *H04L 29/08* (2013.01); *H04L 51/02* (2013.01); *H04L 67/20* (2013.01); *H04L 67/306* (2013.01); *H04W 4/08* (2013.01)

(56) References Cited

U.S. PATENT DOCUMENTS

| | | | |
|---|---|---|---|
| 9,288,123 B1* | 3/2016 | Safford | G06Q 50/01 |
| 9,760,910 B1* | 9/2017 | Tuchman | G06Q 50/01 |
| 10,467,630 B2* | 11/2019 | Iyer | G06Q 30/016 |
| 2008/0263158 A1* | 10/2008 | Cacho | G06Q 10/107 709/206 |
| 2009/0138328 A1* | 5/2009 | Higgins | G06Q 30/02 705/14.1 |
| 2012/0036204 A1* | 2/2012 | Cole | G06Q 10/10 709/206 |
| 2012/0095846 A1* | 4/2012 | Leverant | G06Q 50/01 705/14.73 |
| 2012/0150973 A1* | 6/2012 | Barak | G06Q 30/0609 709/206 |
| 2012/0303614 A1* | 11/2012 | Mercuri | G06Q 10/101 707/723 |
| 2013/0218640 A1* | 8/2013 | Kidder | G06Q 30/0254 705/7.33 |
| 2013/0262598 A1* | 10/2013 | Makanawala | H04L 51/32 709/206 |
| 2013/0275179 A1* | 10/2013 | Marshall | G06Q 30/0214 705/7.29 |
| 2014/0006175 A1* | 1/2014 | Grigg | G06Q 30/02 705/14.73 |
| 2014/0180788 A1* | 6/2014 | George | G06Q 30/0269 705/14.41 |
| 2014/0270145 A1* | 9/2014 | Erhart | H04M 3/523 379/265.13 |
| 2014/0278865 A1* | 9/2014 | Kumar | G06Q 30/0214 705/14.16 |
| 2014/0297764 A1* | 10/2014 | Skiba | H04M 3/5175 709/206 |
| 2015/0032724 A1* | 1/2015 | Thirugnanasundaram | G06F 17/30654 707/722 |
| 2015/0039524 A1* | 2/2015 | Leach | G06Q 30/0282 705/319 |
| 2015/0081571 A1* | 3/2015 | Chauhan | G06Q 30/016 705/304 |
| 2015/0244653 A1* | 8/2015 | Niu | H04L 51/02 715/752 |
| 2015/0281138 A1* | 10/2015 | Niu | H04L 51/02 709/206 |
| 2015/0347357 A1* | 12/2015 | Maughan | G06F 17/2235 715/205 |
| 2015/0379535 A1* | 12/2015 | Wang | G06Q 30/0204 705/7.33 |
| 2016/0034936 A1* | 2/2016 | Bryant, III | G06Q 50/01 705/14.16 |
| 2016/0048900 A1* | 2/2016 | Shuman | G06Q 30/0631 705/7.33 |
| 2016/0092958 A1* | 3/2016 | Goldstein | G06Q 20/201 705/26.62 |
| 2016/0094509 A1* | 3/2016 | Ye | H04L 51/32 709/206 |
| 2016/0105387 A1* | 4/2016 | Jackson | H04W 4/21 709/206 |
| 2016/0140619 A1* | 5/2016 | Soni | G06Q 30/0269 705/14.66 |
| 2016/0164982 A1* | 6/2016 | LeBeau | H04L 67/18 709/204 |
| 2016/0170991 A1* | 6/2016 | Birchall | G06F 16/24578 707/751 |
| 2016/0179819 A1* | 6/2016 | Narayanan | G06F 16/24 707/728 |
| 2016/0180113 A1* | 6/2016 | Patton | G06F 16/9535 726/28 |
| 2016/0232463 A1* | 8/2016 | McDonough | G06Q 10/0633 |
| 2016/0294748 A1* | 10/2016 | Yang | H04L 51/32 |
| 2016/0301642 A1* | 10/2016 | Zou | H04L 51/32 |

FOREIGN PATENT DOCUMENTS

| | | |
|---|---|---|
| CN | 103581287 A | 2/2014 |
| CN | 104123313 A | 10/2014 |
| CN | 104348612 A | 2/2015 |
| CN | 104702675 A | 6/2015 |

OTHER PUBLICATIONS

Tencent Technology, IPRP, PCT/CN2016/072136, Aug. 15, 2017, 9 pgs.

* cited by examiner

USER EVENT RESPONDING METHOD AND APPARATUS

PRIORITY CLAIM AND RELATED APPLICATION

This application is a continuation-in-part application of PCT Patent Application No. PCT/CN2016/072136, entitled "USER EVENT RESPONDING METHOD AND APPARATUS" filed on Jan. 26, 2016, which claims priority to Chinese Patent Application No. 201510076987.X, entitled "USER EVENT RESPONDING METHOD AND APPARATUS" filed on Feb. 13, 2015, both of which are incorporated by reference in their entirety.

FIELD OF THE TECHNOLOGY

The present disclosure relates to the field of communication technologies, and in particular, to a user event responding method and apparatus.

BACKGROUND OF THE DISCLOSURE

With rapid development of communication technologies, increasing Internet application servers emerge. When an Internet application server has a large quantity of users, some third-party servers may establish a cooperative relationship with the Internet application server to promote their products or services via the Internet application server. On that basis, a user may establish a communication relationship with a third-party server by using the Internet application server. That is, a user event triggered by the user with respect to the third-party server first reaches the Internet application server, and then the Internet application server transmits the user event to the third-party server. The user event may be a message sent by the user to the third-party server, or may be some operations performed by the user with respect to the third-party server, for example, an operation that the user subscribes to the third-party server. When the user uses a terminal to trigger a user event with respect to the third-party server by using the Internet application server, the third-party server needs to ensure a capability of responding to the user event in time, to bring the user good operation experience.

In related technologies, for responding to a user event triggered by a user, a method generally used is: After detecting a user event that is triggered by a terminal with respect to a third-party server, an Internet application server sends a user event notification message to the third-party server, where the user event notification message carries an Internet application identifier and an event type. After receiving the user event notification message, the third-party server triggers sending of a notification message to specified working personnel. The specified working personnel determine a responding manner for the user event. After obtaining the responding manner determined by the specified working personnel, the third-party server sends, to the Internet application server, a response message carrying the responding manner. The Internet application server sends the response message to the terminal corresponding to the Internet application identifier.

In an implementation process of the present disclosure, the inventor finds that the related technologies have at least the following problem:

In the related technologies, after the third-party server receives the user event notification message, the responding manner needs to be determined manually. It is labor-consuming and time-consuming to determine the responding manner. As a result, the user event responding manner has high costs and low efficiency.

SUMMARY

To resolve the problem in the existing technology, embodiments of the present disclosure provide a user event responding method and apparatus. The technical solutions are as follows:

According to a first aspect, a user event responding method is provided, the method being applied to a scenario in which a terminal interacts with a third-party server based on an Internet application server, the method being applied to the Internet application server, and the method including:

detecting a user event that is triggered by the terminal with respect to the third-party server by using the Internet application server, the user event carrying an Internet application identifier and a public identifier of the third-party server;

obtaining, according to the public identifier, a response message corresponding to the detected user event, the response message being determined according to a mapping relationship between a user event and a response message; and returning the obtained response message to the terminal corresponding to the Internet application identifier.

According to a second aspect, a user event responding apparatus is provided, the apparatus being applied to a scenario in which a terminal interacts with a third-party server based on an Internet application server, the apparatus being applied to the Internet application server, and the apparatus including:

a detection module, configured to detect a user event that is triggered by the terminal with respect to the third-party server by using the Internet application server, the user event carrying an Internet application identifier and a public identifier of the third-party server;

an obtaining module, configured to obtain, according to the public identifier, a response message corresponding to the detected user event, the response message being determined according to a mapping relationship between a user event and a response message; and a returning module, configured to return the obtained response message to the terminal corresponding to the Internet application identifier.

The technical solutions provided in the embodiments of the present disclosure bring beneficial effects as follows:

After a user event that is triggered by a terminal with respect to a third-party server by using an Internet application server is detected, a response message corresponding to the detected user event is obtained according to a mapping relationship between a user event and a response message, and the response message is returned to the terminal. This implements a manner of automatically returning a response message to a terminal based on an Internet application server and makes a user event responding manner independent of manual work, which can reduce responding costs and improve responding efficiency.

BRIEF DESCRIPTION OF THE DRAWINGS

To describe the technical solutions of the embodiments of the present disclosure more clearly, the accompanying drawings for illustrating the embodiments are introduced briefly in the following. Apparently, the drawings in the following description are merely some embodiments of the present

DESCRIPTION OF EMBODIMENTS

To make the objectives, technical solutions, and advantages of the present disclosure clearer, the following further describes in detail the embodiments of the present disclosure with reference to the accompanying drawings.

Figure 1:
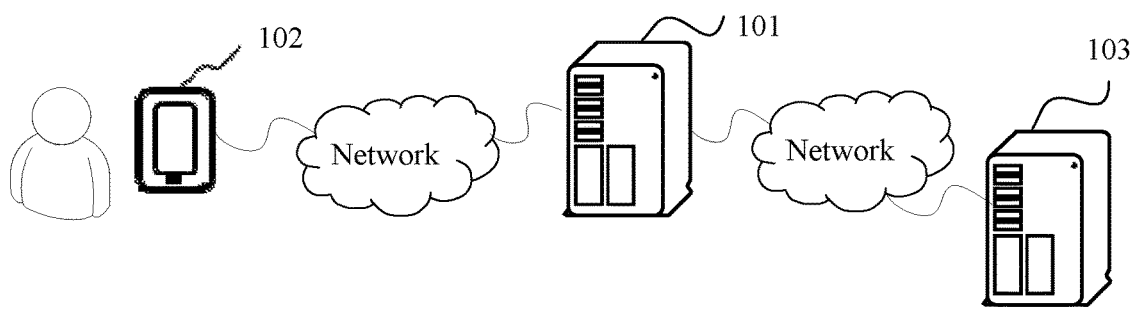
FIG. 1 is a schematic diagram of an implementation environment involved in a user event responding method according to an embodiment of the present disclosure.

FIG. 1 is a schematic diagram of an implementation environment involved in a user event responding method according to an embodiment of the present disclosure. As shown in FIG. 1, the implementation environment includes an Internet application server 101, a terminal 102, and a third-party server 103. The Internet application server 101 and the terminal 102 are connected by using a network, and the Internet application server 101 and the third-party server 103 are connected by using a network. The network may be a wired network or a wireless network.

The method provided in this embodiment of the present disclosure is applied to a scenario in which the terminal 102 interacts with the third-party server 103 based on the Internet application server 101. Specifically, the Internet application server 101 may provide a social networking application service to a user corresponding to the terminal 102. The third-party server 103 may establish in advance a cooperative relationship with the Internet application server 101, to promote its product and service via the Internet application server 101. The user corresponding to the terminal 102 may determine the third-party server 103 on the Internet application server 101 based on a public identifier by using an Internet application identifier, and trigger a user event with respect to the third-party server 103.

The public identifier is an application account that a developer or merchant corresponding to the third-party server 103 applies for on the Internet application server 101. By means of the public identifier, the developer or merchant may push information to users or communicate or interact with users on the Internet application server 101 in text, picture, voice, video, and other manners. Specifically, the public identifier may be an official account corresponding to the third-party server 103. The specific form of the public identifier is not specifically limited in this embodiment of the present disclosure.

The user event may be a social networking application message sent by the terminal 102 to the third-party server 103, or may be a related operation triggered by the user corresponding to the terminal 102 with respect to the third-party server 103. The related operation may be an operation of subscribing to the public identifier corresponding to the third-party server 103, or may be an operation of scanning a related two-dimensional code provided by the third-party server 103 or the like.

A server that provides a service by using the Internet may be configured as the Internet application server 101. The Internet application server 101 may be an instant messaging server or a social networking application server, or may be a server that can implement payment and other services by using the Internet. The specific type of the Internet application server 101 is not limited in this embodiment of the present disclosure. The third-party server 103 may be a platform that provides a product or service, and a server may be configured as the third-party server 103. The terminal 102 is a terminal that can implement the social networking application service. The terminal 102 may be a desktop computer, a smart phone, a tablet computer, an e-book reader, a moving picture experts group audio layer III (MP3) player, a moving picture experts group audio layer IV (MP4) player, a portable laptop computer, a wearable device such as a smart band, or the like. According to some embodiments, the Internet application server 101 provides instant messaging service (e.g., WeChat, an instant messaging service offered by Tencent) to users who have accounts with the Internet application server 101. One type of the user accounts is associated with an individual that exchange messages with other user accounts and another type of the user accounts is associated with an entity like the third-party server 103 that promote certain product or service of its own among its subscribing user accounts. In this case, the third-party server 103 is also known as an "official account", "public account" or "public identifier" of a third-party service provider. As such, the third-party server 103 and the Internet application server 101 are often managed by the same entity (e.g., Tencent), which may be a standalone computer server as shown in FIG. 1 or integrated together with the Internet application server 101. A user associated with the official account of the third-party service provider logs into the official account hosted the Internet application server 101 and manages the services it provides to its subscribing user accounts as described below.

In this embodiment of the present disclosure, after the user corresponding to the terminal 102 triggers a user event with respect to the third-party server 103 on the Internet application server 101, the third-party server 103 automatically returns a response message to the terminal 102 based on the Internet application server 101. For details of the specific user event responding method, refer to the following embodiments.

Figure 2:
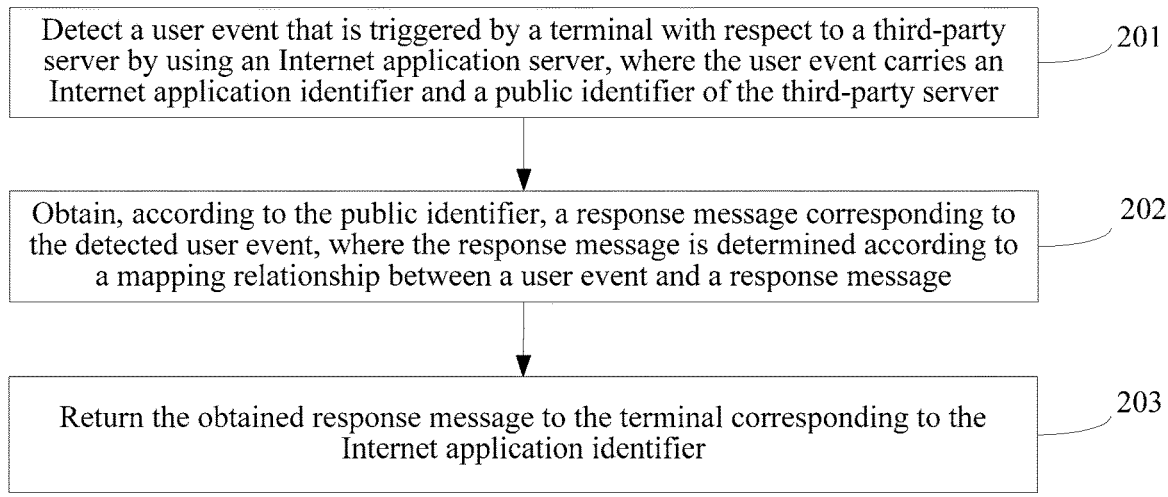
FIG. 2 is a flowchart of a user event responding method according to another embodiment of the present disclosure.

With reference to the schematic diagram of the implementation environment shown in FIG. 1, FIG. 2 is a flowchart of a user event responding method according to another embodiment of the present disclosure. The method is applied to a scenario in which a terminal interacts with a third-party server based on an Internet application server. Description is made by using an example in which the Internet application server executes the method provided in this embodiment of the present disclosure. As shown in FIG.

2, a process of the method provided in this embodiment of the present disclosure includes:

201: Detect a user event that is triggered by the terminal with respect to the third-party server by using the Internet application server, where the user event carries an Internet application identifier and a public identifier of the third-party server.

202: Obtain, according to the public identifier, a response message corresponding to the detected user event, where the response message is determined according to a mapping relationship between a user event and a response message. In the present disclosure, the mapping relationship between a user event and a response message is also referred to as an "auto-response rule" for providing an auto response preset by the third-party service account to a subscribing user account based on the parameters associated with the subscribing user account (e.g., location, gender, age, profession, time zone, etc.) and the preference of the third-party service account. This auto response is associated with one or more keywords such that it is selected by the Internet application server for responding to a user event when there is a match between the keywords and keywords associated with the user event (e.g., keywords extracted from a message submitted by the subscribing user account). In some embodiments, there are overlaps between different auto-response rules such that the same user event may correspond to multiple candidate auto responses. When this happens, the Internet application server may rank the multiple candidate auto responses by their respective relevance to the user event using, e.g., certain parameters associated with the user event and choose the one with the highest ranking score as the response message to the returned to the terminal that triggers the user event. In some other embodiments, the Internet application server compiles the multiple candidate auto responses into one more comprehensive auto response message to be returned to the terminal. In yet some other embodiments, the Internet application server may supplement the auto response message preset by the third-party service account with additional information, e.g., information retrieved from the Internet using keywords associated with the third-party service account and the user event.

In another embodiment, the obtaining, according to the public identifier, a response message corresponding to the detected user event includes:

obtaining, according to the public identifier, the mapping relationship between a user event and a response message that is preset by the third-party server; and querying the mapping relationship according to the detected user event, and using the response message corresponding to the detected user event in the mapping relationship as the obtained response message.

In another embodiment, the obtaining, according to the public identifier, the mapping relationship between a user event and a response message that is preset by the third-party server includes:

providing an information obtaining interface to the third-party server according to the public identifier; and obtaining the mapping relationship between a user event and a response message that is preset by the third-party server in the information obtaining interface.

In another embodiment, the detected user event is a detected social networking application message, the detected social networking application message is sent by the terminal to the third-party server, and the mapping relationship is a mapping relationship between a social networking application message and a response message; and the obtaining, according to the public identifier, a response message corresponding to the detected user event includes:

obtaining, according to the public identifier, a mapping relationship between a social networking application message and a response message that corresponds to the third-party server; and obtaining, according to the mapping relationship between a social networking application message and a response message, a response message corresponding to the detected social networking application message.

In another embodiment, the mapping relationship between a social networking application message and a response message is a mapping relationship between a keyword in a social networking application message and a response message; and the obtaining, according to the mapping relationship between a social networking application message and a response message, a response message corresponding to the detected social networking application message includes:

performing matching between the detected social networking application message and the keyword in the mapping relationship; and when the detected social networking application message matches any keyword in the mapping relationship, using a response message corresponding to the any keyword as the response message corresponding to the detected social networking application message.

In another embodiment, the using a response message corresponding to the any keyword as the response message corresponding to the detected social networking application message includes:

using all response messages corresponding to the any keyword as response messages corresponding to the detected social networking application message; or selecting any one of all response messages corresponding to the any keyword as response messages corresponding to the detected social networking application message.

In another embodiment, before the using a response message corresponding to the any keyword as the response message corresponding to the detected social networking application message, the method further includes:

providing, to the third-party server, a keyword setting interface for setting the mapping relationship between a keyword and a response message; and obtaining the mapping relationship between a keyword and a response message from the keyword setting interface, where one keyword corresponds to at least one response message.

In another embodiment, the performing matching between the detected social networking application message and the keyword in the mapping relationship includes:

when the detected social networking application message is consistent with any keyword in the mapping relationship, determining that the detected social networking application message matches the any keyword; or when the detected social networking application message includes any keyword in the mapping relationship, determining that the detected social networking application message matches the any keyword.

In another embodiment, the detected user event is a detected subscription-related operation, the subscription-related operation is an operation that is executed by a user corresponding to the terminal and that is related to the third-party server, and the mapping relationship is a mapping relationship between a subscription-related operation and a response message; and the obtaining, according to the public identifier, a response message corresponding to the detected user event includes:

obtaining, according to the public identifier, a mapping relationship between a subscription-related operation and a response message that corresponds to the third-party server; and obtaining, according to the mapping relationship between a subscription-related operation and a response message, a response message corresponding to the detected subscription-related operation.

In another embodiment, the obtaining, according to the public identifier, a response message corresponding to the detected user event includes:

sending a user event notification message to the third-party server according to the public identifier, where the user event notification message carries at least event information of the detected user event;

receiving a user event response message sent by the third-party server, where the user event response message carries a responding manner determined by the third-party server for the response message corresponding to the detected user event, and the responding manner is determined by the third-party server according to the event information and the preset mapping relationship between a user event and a response message; and generating the response message according to the responding manner.

In another embodiment, the sending a user event notification message to the third-party server according to the public identifier includes:

when the detected user event is an event that the terminal sends a text message to the third-party server, sending the text message to the third-party server as the user event notification message according to the public identifier.

In another embodiment, the sending a user event notification message to the third-party server according to the public identifier includes:

when the detected user event is an event that the terminal sends a multimedia message to the third-party server, obtaining a multimedia type of the multimedia message and a multimedia identifier of a multimedia file carried in the multimedia message, and using the multimedia type and the multimedia identifier as the event information; and sending, to the third-party server according to the public identifier, the user event notification message carrying at least the multimedia type and the multimedia identifier.

In another embodiment, the sending a user event notification message to the third-party server according to the public identifier includes:

when the detected user event is an event that the terminal sends a geographical location message to the third-party server, obtaining geographical location information of the terminal, and using the geographical location information as the event information; and sending, to the third-party server according to the public identifier, the user event notification message carrying at least the geographical location information.

In another embodiment, the sending a user event notification message to the third-party server according to the public identifier includes:

when the detected user event is an event that the terminal sends a link message to the third-party server, obtaining a link address of the link message, and using the link address as the event information; and sending, to the third-party server according to the public identifier, the user event notification message carrying at least the link address.

In another embodiment, the sending a user event notification message to the third-party server according to the public identifier includes:

when the detected user event is an operation that is executed by the terminal and that is related to the third-party server, obtaining an operation type of the operation, and using the operation type as the event information; and sending, to the third-party server according to the public identifier, the user event notification message carrying at least the operation type.

In another embodiment, the sending a user event notification message to the third-party server according to the public identifier includes:

when the detected user event is an event that the terminal reports a geographical location, obtaining geographical location information of the terminal, and using the geographical location information as the event information; and sending, to the third-party server according to the public identifier, the user event notification message carrying at least the geographical location information.

In another embodiment, the generating the response message according to the responding manner includes:

when the responding manner is responding by means of a text message, receiving a text response message sent by the third-party server, and using the text response message as the generated response message.

In another embodiment, the generating the response message according to the responding manner includes:

when the responding manner is responding by means of a multimedia message, receiving an identifier of a multimedia file carried in a user event response message that is sent by the third-party server and that corresponds to the detected user event;

obtaining a pre-stored multimedia file according to the identifier of the multimedia file; and generating the response message according to the multimedia file.

In another embodiment, after the sending a user event notification message to the third-party server according to the public identifier, the method further includes:

if no user event response message sent by the third-party server is received within a first preset time, re-sending the user event notification message to the third-party server, until a quantity of times of sending the user event notification message reaches a preset quantity of times or a user event response message sent by the third-party server is received.

In another embodiment, before the re-sending the user event notification message to the third-party server, the method further includes:

when a blank message sent by the third-party server is received, canceling the re-sending the user event notification message to the third-party server.

In another embodiment, before the re-sending the user event notification message to the third-party server, the method further includes:

each time the user event notification message is re-sent, recording an identifier of the user event notification message once;

determining, according to a quantity of times of recoding the identifier of the user event notification message, whether the quantity of times of re-sending the user event notification message reaches the preset quantity of times; and if the quantity of times of re-sending the user event notification message reaches the preset quantity of times, stopping the re-sending the user event notification message to the third-party server.

In another embodiment, after the sending a user event notification message to the third-party server according to the public identifier, the method further includes:

if no user event response message sent by the third-party server is received within a second preset time, sending a preset system prompt message to the terminal.

203: Return the obtained response message to the terminal corresponding to the Internet application identifier.

In the method provided in this embodiment of the present disclosure, after a user event that is triggered by a terminal with respect to a third-party server by using an Internet application server is detected, a response message corresponding to the detected user event is obtained according to a mapping relationship between a user event and a response message, and the response message is returned to the terminal. This implements a manner of automatically returning a response message to a terminal based on an Internet application server and makes a user event responding manner independent of manual work, which can reduce responding costs and improve responding efficiency.

Figure 3:
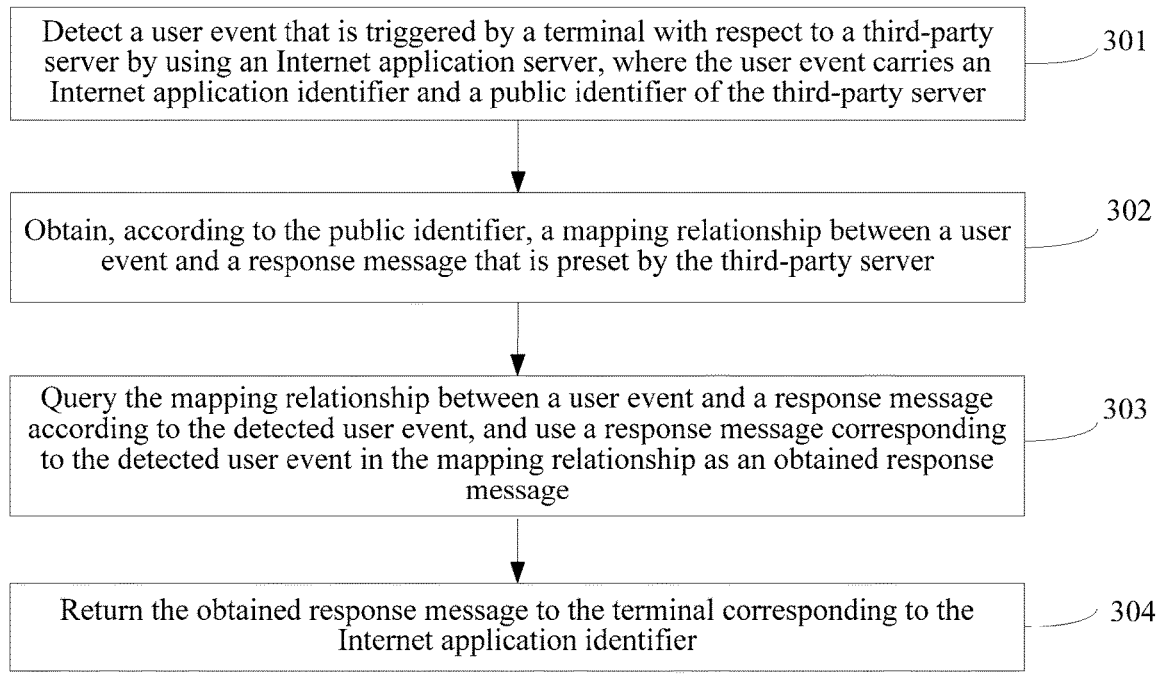
FIG. 3 is a flowchart of a user event responding method according to another embodiment of the present disclosure.

With reference to the schematic diagram of the implementation environment shown in FIG. 1 and the content in the embodiment corresponding to FIG. 2, FIG. 3 is a flowchart of a user event responding method according to another embodiment of the present disclosure. The method is applied to a scenario in which a terminal interacts with a third-party server based on an Internet application server. For ease of description, in this embodiment of the present disclosure, the method provided in this embodiment of the present disclosure is described by using an example in which the third-party server submits in advance a mapping relationship between a user event and a response message to the Internet application server and the Internet application server determines a response message according to the mapping relationship. Description is made by using an example in which the Internet application server executes the method provided in this embodiment of the present disclosure. As shown in FIG. 3, a process of the method provided in this embodiment of the present disclosure includes:

301: Detect a user event that is triggered by the terminal with respect to the third-party server by using the Internet application server, where the user event carries an Internet application identifier and a public identifier of the third-party server.

The user event may be a social networking application message sent by a user to the third-party server by using the terminal. The social networking application message may be a text message, a voice message, a video message, a picture message, or the like, or may be a subscription-related operation, triggered by the user based on the Internet application server by using the corresponding terminal, of subscribing to a public identifier corresponding to the third-party server. For example, the subscription-related operation may be an operation of subscribing to the public identifier corresponding to the third-party server, or may be an operation of unsubscribing to the public identifier corresponding to the third-party server. Certainly, the user event may be another operation that is executed by the terminal with respect to the third-party server based on the Internet application server. The specific type of the user event is not specifically limited in this embodiment of the present disclosure.

In this embodiment of the present disclosure, information exchange between the terminal and the third-party server needs to be implemented based on the Internet application server. That is, data during information exchange between the terminal and the third-party server first reaches the Internet application server, and then is forwarded by the Internet application server. For example, when the user needs to send a social networking application message to the third-party server, the social networking application message is first sent to the Internet application server, and then sent by the Internet application server to the third-party server.

The manner of detecting, by the Internet application server, a user event that is triggered by the terminal with respect to the third-party server by using the Internet application server may change according to different content of the user event. For example, when the user event is a social networking application message sent by the terminal to the third-party server, the Internet application server may detect whether a social networking application message sent by the terminal to the third-party server is received. When the Internet application server receives a social networking application message sent by the terminal to the third-party server, the Internet application server determines that a user event that is triggered by the terminal with respect to the third-party server by using the Internet application server is detected. For another example, when the user event is a subscription-related operation that the terminal subscribes to the public identifier corresponding to the third-party server, the Internet application server may detect whether the terminal executes an operation of subscribing/unsubscribing to the public identifier corresponding to the third-party server. When the Internet application server determines that the terminal executes the operation of subscribing/unsubscribing to the public identifier corresponding to the third-party server, the Internet application server determines that a user event that is triggered by the terminal with respect to the third-party server by using the Internet application server is detected.

To enable the third-party server to know which user triggers the user event, the user event carries at least an Internet application identifier. The Internet application identifier is an identifier registered by the user with the Internet application server, and is a globally unique identifier that distinguishes the user from another user. The Internet application identifier may be a user account, a user phone number, a user e-mail, or the like. The specific content of the Internet application identifier is not specifically limited in this embodiment of the present disclosure. In addition, because there may be multiple third-party servers that establish a communication relationship with the Internet application server, to enable the Internet application server to determine the user event is with respect to which third-party server, the user event further carries the public identifier of the third-party server. Different third-party servers correspond to different public identifiers. By means of the public identifier, the user may find the third-party server by using the terminal, and trigger the user event with respect to the third-party server based on the Internet application server.

302: Obtain, according to the public identifier, the mapping relationship between a user event and a response message that is preset by the third-party server.

When a terminal triggers a user event with respect to a third-party server based on an Internet application server, this embodiment of the present disclosure provides a method in which the third-party server automatically responds to the user event based on the Internet application server. A response message is returned to the terminal to respond to the user event. When the third-party server responds to the user event based on the Internet application server, to determine which response message is returned to the terminal, the Internet application server needs to first obtain a response message corresponding to the detected user event. In this embodiment of the present disclosure, the third-party server presets a mapping relationship between a user event and a response message, and submits the mapping relationship to the Internet application server. On that basis, the Internet application server obtains, according to the mapping relationship between a user event and a response message, the response message corresponding to the detected user event. Before obtaining, according to the mapping relationship, the response message corresponding to the detected user event, the Internet application server needs to first obtain, according to the public identifier, the mapping relationship between a user event and a response message that is preset by the third-party server.

Specifically, the obtaining, by the Internet application server according to the public identifier, the mapping relationship between a user event and a response message that is preset by the third-party server includes but is not limited to: providing an information obtaining interface to the third-party server according to the public identifier; and obtaining the mapping relationship between a user event and a response message that is preset by the third-party server in the information obtaining interface.

When the Internet application server provides the information obtaining interface to the third-party server according to the public identifier, the Internet application server first determines the corresponding third-party server according to the public identifier, and then provides the information obtaining interface to the third-party server. The information obtaining interface is used by the third-party server to set the mapping relationship between a user event and a response message. After the third-party server establishes a cooperative relationship with the Internet application server, the Internet application server may provide an information obtaining interface to the third-party server. After setting the mapping relationship between a user event and a response message in the information obtaining interface, the third-party server submits the mapping relationship between a user event and a response message to the Internet application server. The Internet application server may obtain the mapping relationship by receiving the mapping relationship between a user event and a response message that is submit by the third-party server.

There may be many types of user events. The mapping relationship between a user event and a response message changes according to different types of user events. For example, when the user event is a social networking application message sent by the terminal to the third-party server, the mapping relationship between a user event and a response message is a mapping relationship between a social networking application message and a response message. When the user event is a subscription-related operation that is executed by the terminal with respect to the third-party server based on the Internet application server, the mapping relationship between a user event and a response message is a mapping relationship between a subscription-related operation and a response message.

Figure 4:
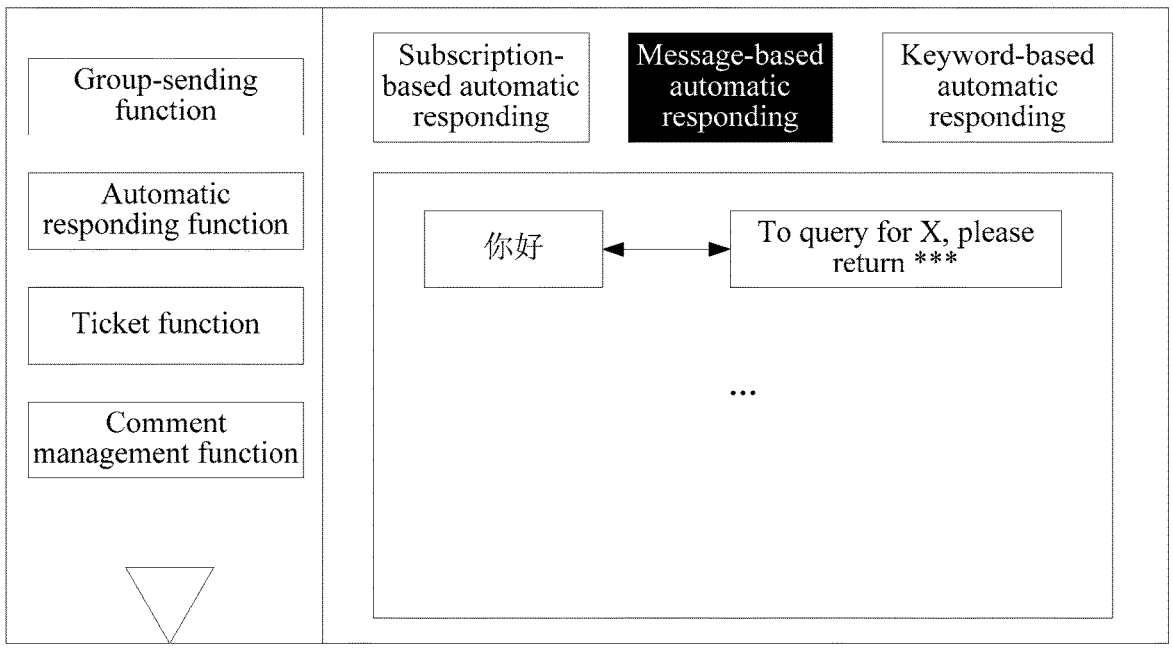
FIG. 4 is a schematic diagram of an information obtaining interface according to another embodiment of the present disclosure.

As shown in FIG. 4, FIG. 4 shows a schematic diagram of an information obtaining interface. Options such as "message-based automatic responding" and "subscription-based automatic responding" are provided in the information obtaining interface. When the Internet application server detects that the "message-based automatic responding" option is selected, the third-party server may set the mapping relationship between a social networking application message and a response message. As shown in Table 1, Table 1 shows a mapping relationship between a social networking application message and a response message that is preset by the third-party server.

TABLE 1

| Social application message | Response message |
| --- | --- |
| Social application message A | Response message A |
| . . . | . . . |
| Social application message B | Response message B |

Still as shown in FIG. 4, when the Internet application server detects that the "subscription-based automatic responding" option is selected, the third-party server may set the mapping relationship between a subscription-related operation and a response message based on the Internet application server. As shown in Table 2, Table 2 shows a mapping relationship between a subscription-related operation and a response message that is preset by the third-party server.

TABLE 2

| Subscription-related operation | Response message |
| --- | --- |
| Subscribe to the third-party server | Response message a |
| . . . | . . . |
| Unsubscribe to the third-party server | Response message b |

Certainly, data in Table 1 and Table 2 is merely examples for description, and does not limit this embodiment of the present disclosure.

Further, when the user event is an event that the terminal sends a social networking application message to the third-party server, because different terminals may send different social networking application messages, and social networking application messages sent by some terminals may have content that is not completely consistent with that in the social networking application message in the mapping relationship, to ensure that the Internet application server still can return a response message to a terminal when a social networking application message sent by the terminal is not completely consistent with the social networking application message in the mapping relationship, the mapping relationship between a social networking application message and a response message that is preset by the third-party server may be a mapping relationship between a keyword in a social networking application message and a response message.

Specifically, the Internet application server may provide, to the third-party server, a keyword setting interface for setting the mapping relationship between a keyword and a response message, and obtain the mapping relationship between a keyword and a response message from the keyword setting interface, where one keyword corresponds to at least one response message. For example, the third-party server may also obtain, from the information obtaining interface shown in FIG. 4, the mapping relationship between a keyword and a response message. Specifically, the information obtaining interface may further provide a "keyword-based automatic responding" option. When the Internet application server detects that the "keyword-based automatic responding" option in the information obtaining interface is selected, the third-party server may set the mapping relationship between a keyword and a response message based on the Internet application server. As shown in Table 3, Table 3 shows a mapping relationship between a keyword and a response message that is preset by the third-party server.

TABLE 3

| Keyword | Response message |
|---------|------------------|
| A       | a                |
| ...     | ...              |
| B       | b                |

Data in Table 3 is merely an example for description, and does not limit this embodiment of the present disclosure.

When the third-party server sets the mapping relationship between a keyword and a response message in the information obtaining interface, this embodiment of the present disclosure does not limit a quantity of correspondences between a keyword and a response message that are set by the third-party server. For example, each third-party server may set 200 correspondences between a keyword and a response message, or may set 300 correspondences between a keyword and a response message. In each correspondence between a keyword and a response message, there may be one or more keywords, which is not specifically limited in this embodiment. For example, each correspondence between a keyword and a response message may include 10 keywords or 20 keywords. A quantity of Chinese characters included in each keyword may be determined according to a need of the third-party server. For example, the quantity of Chinese characters included in the keyword may be 2, 10, or 30. In each correspondence between a keyword and a response message, one keyword may correspond to one or more response messages, which is not specifically limited in this embodiment. For example, one keyword may correspond to five response messages or 10 response messages. It should be noted that, data in Table 3 is merely an example in which one keyword corresponds to one response message for description.

It should be noted that, the operation of obtaining, by the Internet application server according to the public identifier, the mapping relationship between a user event and a response message that is preset by the third-party server is not a step that needs to be performed each time the user event responding method is executed, as long as it is ensured that before the user event responding method is executed, the Internet application server has obtained the mapping relationship between a user event and a response message that is set by the third-party server.

303: Query the mapping relationship between a user event and a response message according to the detected user event, and use a response message corresponding to the detected user event in the mapping relationship as an obtained response message.

When the mapping relationship between a user event and a response message is queried according to the detected user event, the detected user event may be compared with all user events in the mapping relationship, and a response message corresponding to the detected user event in the mapping relationship is used as an obtained response message.

It should be noted that, step 302 and step 303 are a specific implementation manner of obtaining, by the Internet application server according to the public identifier, a response message corresponding to the detected user event. It can be obtained from the content in step 301 that, a user event may have different content. Therefore, the detected user event may also have different content. According to the content of the detected user event, the manner of obtaining, by the Internet application server according to the public identifier, a response message corresponding to the detected user event is also different. Specifically, when the user event includes a social networking application message sent by the terminal to the third-party server or a subscription-related operation executed by the terminal with respect to the third-party server, the manner of obtaining, by the Internet application server according to the public identifier, a response message corresponding to the detected user event includes but is not limited the following two cases:

First case: The detected user event is a detected social networking application message, where the detected social networking application message is sent by the terminal to the third-party server. In this case, the obtaining, by the Internet application server according to the public identifier, a response message corresponding to the detected user event may be implemented according to the mapping relationship between a social networking application message and a response message.

Specifically, the Internet application server may obtain, according to the public identifier, a mapping relationship between a social networking application message and a response message that corresponds to the third-party server, and obtain, according to the mapping relationship between a social networking application message and a response message, a response message corresponding to the detected social networking application message.

When the Internet application server obtains, according to the public identifier, the mapping relationship between a social networking application message and a response message that corresponds to the third-party server, if the Internet application server has locally stored the mapping relationship between a social networking application message and a response message that corresponds to the third-party server, the Internet application server may directly obtain the mapping relationship locally. If the Internet application server has not locally stored the mapping relationship between a social networking application message and a response message that corresponds to the third-party server, the Internet application server may obtain the mapping relationship between a social networking application message and a response message from the third-party server.

In addition, according to the data in Table 3, the obtaining, by the Internet application server according to the public identifier, a response message corresponding to the detected user event may be implemented according to a mapping relationship between a keyword in a social networking application message and a response message that corresponds to the third-party server. Specifically, the Internet application server may perform matching between the detected social networking application message and all keywords in the mapping relationship, and when determining that the detected social networking application message matches a keyword in the mapping relationship, use a response message corresponding to the keyword as a response message corresponding to the detected social networking application message.

The Internet application server may perform matching between the detected social networking application message and the keyword in the mapping relationship by determining whether the detected social networking application message is consistent with any keyword in the mapping relationship. Specifically, when the detected social networking application message is consistent with any keyword in the mapping relationship, the Internet application server determines that the detected social networking application message matches the any keyword.

For example, when the detected social networking application message is "你好", and a keyword in the mapping relationship is "你好", because the detected social networking application message is consistent with "你好" in the mapping relationship, it is determined that the detected social networking application message matches the keyword in the mapping relationship.

In addition, the Internet application server may alternatively determine whether the detected social networking application message includes any keyword in the mapping relationship. When the detected social networking application message includes any keyword in the mapping relationship, the Internet application server determines that the detected social networking application message matches the any keyword. For example, when the detected social networking application message is "1234", and a keyword in the mapping relationship is "123", because the detected social networking application message "1234" includes "123" in the mapping relationship, it is determined that the detected social networking application message matches the keyword in the mapping relationship.

Further, when a response message corresponding to a keyword is set, one keyword may set to corresponding to multiple response messages. When the Internet application server uses the response message corresponding to the any keyword as the response message corresponding to the detected social networking application message, the Internet application server may use, according to the setting of the third-party server, all response messages corresponding to the any keyword as response messages corresponding to the detected social networking application message; or select one of all response messages corresponding to the any keyword as the response message corresponding to the detected social networking application message.

The Internet application server may provide a "return all" option in the keyword setting interface. When the Internet application server detects that the third-party server selects "return all" during keyword setting, the Internet application server uses all the response messages corresponding to the keyword as the response messages corresponding to the detected social networking application message. When the Internet application server detects that the third-party server does not select "return all" during keyword setting, the Internet application server selects any one or more of all the response messages corresponding to the keyword as the response message corresponding to the detected social networking application message.

Figure 5:
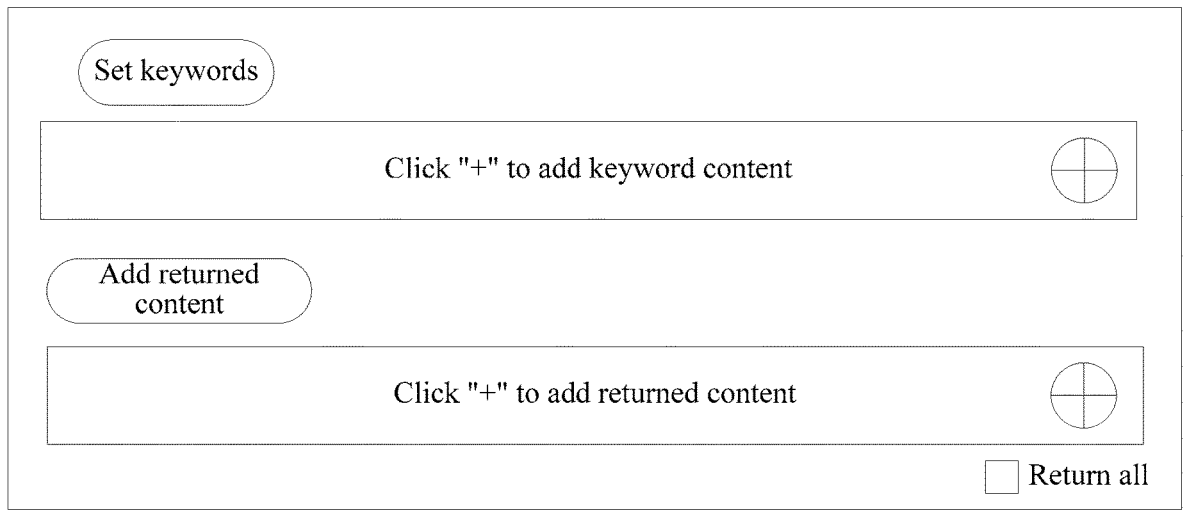
FIG. 5 is a schematic diagram of a keyword setting interface according to another embodiment of the present disclosure.

As shown in FIG. 5, FIG. 5 shows a schematic diagram of a keyword setting interface. When the "return all" option in the keyword setting interface shown in FIG. 5 is selected, when the Internet application server detects that the social networking application message includes a keyword, the Internet application server uses all response messages corresponding to the keyword as response messages corresponding to the detected social networking application message.

Second case: The detected user event is a detected subscription-related operation, where the subscription-related operation is an operation that is executed by the user corresponding to the terminal and that is related to the third-party server. In this case, the obtaining, by the Internet application server according to the public identifier, a response message corresponding to the detected user event may be implemented according to the mapping relationship between a subscription-related operation and a response message.

Specifically, the Internet application server may obtain, according to the public identifier, a mapping relationship between a subscription-related operation and a response message that corresponds to the third-party server, and obtain, according to the mapping relationship between a subscription-related operation and a response message, a response message corresponding to the detected subscription-related operation.

When the Internet application server obtains, according to the public identifier, the mapping relationship between a subscription-related operation and a response message that corresponds to the third-party server, if the Internet application server has locally stored the mapping relationship between a subscription-related operation and a response message that corresponds to the third-party server, the Internet application server may directly obtain the mapping relationship locally. If the Internet application server has not locally stored the mapping relationship between a subscription-related operation and a response message that corresponds to the third-party server, the Internet application server may request the mapping relationship between a subscription-related operation and a response message from the third-party server.

It should be noted that, the first case and the second case are merely examples in which the user event is a social networking application message sent by the terminal to the third-party server or a subscription-related operation executed by the terminal with respect to the third-party server for specifically describing the manner of obtaining, by the Internet application server according to the public identifier, a response message corresponding to the detected user event. The user event may be another event. For example, the user event may be an event that the terminal scans a two-dimensional code corresponding to the third-party server, or an event that the terminal reports a geographical location to the third-party server. When the user event is another event, the principle used by the Internet application server to obtain, according to the public identifier, a response message corresponding to the detected user event is consistent with those in the first case and the second case, and details are not described herein again.

304: Return the obtained response message to the terminal corresponding to the Internet application identifier.

Figure 6:
FIG. 6 is a schematic diagram of a terminal interface according to another embodiment of the present disclosure.

To respond in time to the user event triggered by the terminal, the Internet application server returns the obtained response message to the terminal corresponding to the Internet application identifier. The manner of returning the obtained response message to the terminal corresponding to the Internet application identifier is not specifically limited in this embodiment of the present disclosure. As shown in FIG. 6, FIG. 6 is a schematic diagram of a terminal interface when the response message is returned to the terminal corresponding to the Internet application identifier. After the terminal receives and displays the response message, the corresponding user may obtain a responding status of the third-party server in time, and obtain content needed from the response message. Therefore, good operation experience can be brought to the user.

In the method provided in this embodiment of the present disclosure, after a user event that is triggered by a terminal with respect to a third-party server by using an Internet application server is detected, a response message corresponding to the detected user event is obtained according to a mapping relationship between a user event and a response message that is obtained in advance from the third-party server, and the response message is returned to the terminal. This implements a manner of automatically returning a response message to a terminal based on an Internet application server and makes a user event responding manner independent of manual work, which can reduce responding costs and improve responding efficiency.

Figure 7:
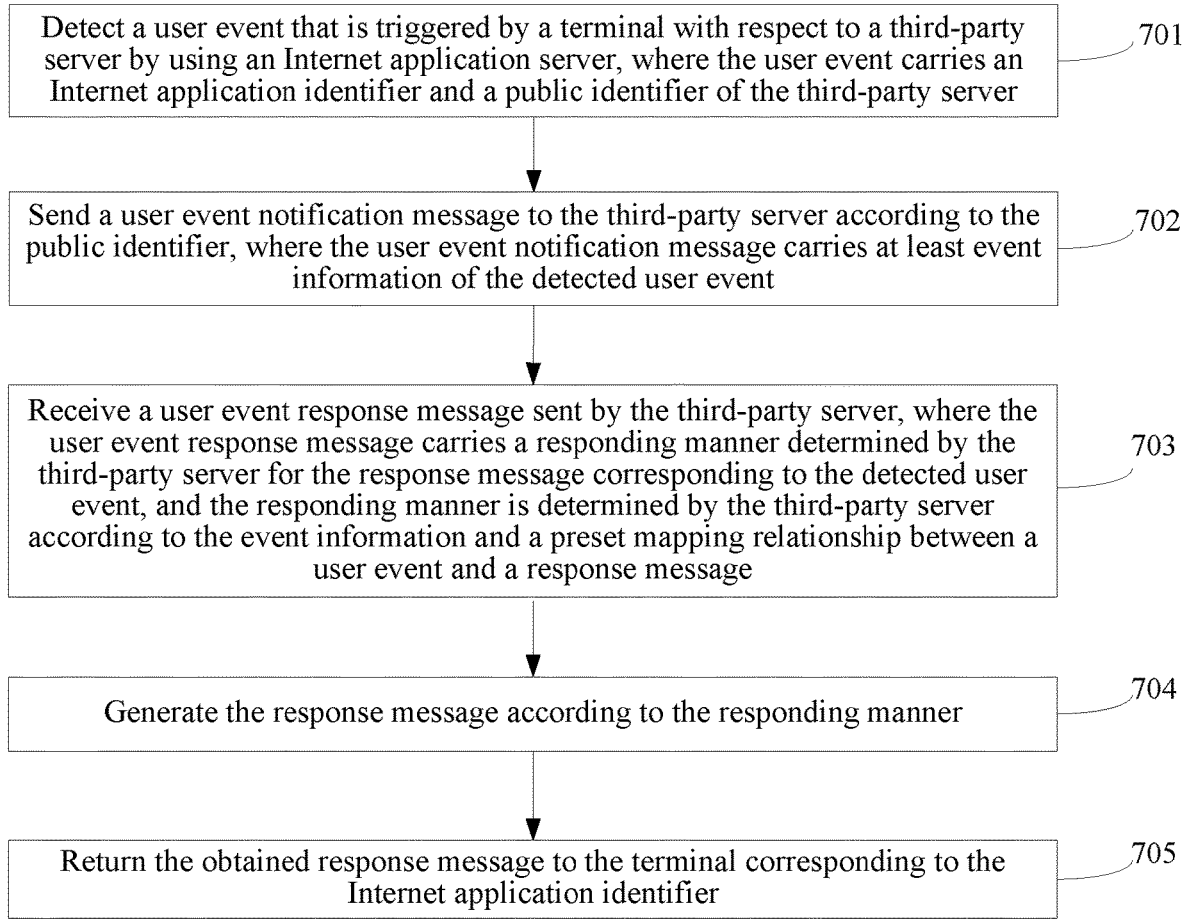
FIG. 7 is a flowchart of a user event responding method according to another embodiment of the present disclosure.

With reference to the schematic diagram of the implementation environment shown in FIG. 1 and the content in the embodiment corresponding to FIG. 2 or FIG. 3, FIG. 7 is a flowchart of a user event responding method according to another embodiment of the present disclosure. The method is applied to a scenario in which a terminal interacts with a third-party server based on an Internet application server. For ease of description, in this embodiment of the present disclosure, the method provided in this embodiment of the present disclosure is described by using an example in which the Internet application server sends a user event notification message to the third-party server after detecting a user event that is triggered by the terminal with respect to the third-party server, and after the third-party server determines a responding manner for the user event, the Internet application server generates a response message according to the responding manner and returns the response message to the terminal. Description is made by using an example in which the Internet application server executes the method provided in this embodiment of the present disclosure. As shown in FIG. 7, a process of the method provided in this embodiment of the present disclosure includes:

701: Detect a user event that is triggered by the terminal with respect to the third-party server by using the Internet application server, where the user event carries an Internet application identifier and a public identifier of the third-party server.

The principle of this step is consistent with that of step 302. For details, refer to the content in step 302. Details are not described herein again.

702: Send a user event notification message to the third-party server according to the public identifier, where the user event notification message carries at least event information of the detected user event.

To enable the third-party server to obtain information such as which user triggers what user event based on the Internet application server at what time, after detecting that the terminal triggers a user event with respect to the third-party server, the Internet application server may send, to the third-party server according to the public identifier, a user event notification message carrying event information, to notify the third-party server of the user event triggered by the terminal.

The specific content of the event information is not specifically limited in this embodiment of the present disclosure, and may be determined according to the specific type of the user event during specific implementation. For example, the event information may include the Internet application identifier, a user event notification message creation time, a user event type, and a user event identifier. For specific content included in the event information, refer to data in subsequent tables. Details are not described herein.

The Internet application identifier is an identifier such as an account that is registered by the user with the Internet application server, and an Internet application identifier of one user may distinguish from an Internet application identifier of another user. The Internet application identifier may be a user account, or may be a user phone number, an e-mail account, or the like. The user event notification message creation time is a time at which the Internet application server detects the user event and generates the user event notification message. The user event type is used to identify a type of the detected user event. For example, the user event type may identify whether the detected user event is a social networking application message sent by the terminal or an operation that is executed by the terminal and that is related to the third-party server. The user event identifier is an identifier of the user event for distinguishing from another user event. For example, the user event identifier is a social networking application message identifier or a subscription operation identifier.

It can be known from the content in step 301 that, the detected user event may be of different types. When the detected user event is an event of a different type, the manner of sending, by the Internet application server, a user event notification message to the third-party server according to the public identifier is also different, and the user event notification message also carries different event information. The event information and the manner of sending, by the Internet application server, a user event notification message to the third-party server according to the public identifier are described below in detail according to the specific type of the detected user event. For details, refer to the following several cases:

First case: The detected user event is an event that the terminal sends a text message to the third-party server. Because the text message occupies little storage space, when the detected user event is an event that the terminal sends a text message to the third-party server, the Internet application server may directly send the text message to the third-party server as the user event notification message. That is, the Internet application server may directly send the text message to the third-party server as the user event notification message according to the public identifier.

In this case, the event information carried in the user event notification message may include the Internet application identifier, a text message creation time, a message type, text message content, and a message identifier. As shown in Table 4, Table 4 shows specific content of event information when the detected user event is an event that the terminal sends a text message to the third-party server.

TABLE 4

| Event information | Description |
| --- | --- |
| ToUserName | Public identifier |
| FromUserName | Internet application identifier, which may be an OpenID |
| CreateTime | Text message creation time (integer type) |
| MsgType | Message type: text |
| Content | Text message content |
| MsgId | Message identifier |

According to the content in Table 4, the Internet application server may send the user event notification message by sending the following Extensible Markup Language (XML)-format data packet to the third-party server:

```
"<xml>
  <ToUserName><![CDATA[toUser]]></ToUserName>
  <FromUserName><![CDATA[fromUser]]></FromUserName>
  <CreateTime>1348831860</CreateTime>
  <MsgType><![CDATA[text]]></MsgType>
  <Content><![CDATA[this is a test]]></Content>
  <MsgId>1234567890123456</MsgId>
</xml>".
```

Second case: The detected user event is an event that the terminal sends a multimedia message to the third-party server. The multimedia message usually includes content such as a picture, a video, and a voice, the content occupies large storage space, and it takes a long time to send the content to the third-party server. Therefore, to save storage space of the third-party server and increase a responding speed, in this embodiment of the present disclosure, the event information in the user event notification message sent by the Internet application server may include only an identifier of a multimedia file, rather than include specific content of the multimedia file. The third-party server can identify the specific content of the multimedia file according to the identifier of the multimedia file. The manner of identifying, by the third-party server, the specific content of the multimedia file according to the identifier of the multimedia file is not specifically limited in this embodiment. In addition, because there are multiple multimedia types, to ensure that the third-party server can quickly identify the multimedia file, the event information may further include a multimedia type.

According to the content above, when the detected user event is an event that the terminal sends a multimedia message to the third-party server, the sending, by the Internet application server, a user event notification message to the third-party server according to the public identifier may include but not limited to: obtaining a multimedia type of the multimedia message and a multimedia identifier of a multimedia file carried in the multimedia message, and using the multimedia type and the multimedia identifier as the event information; and sending, to the third-party server according to the public identifier, the user event notification message carrying at least the multimedia type and the multimedia identifier.

The multimedia message includes but is not limited to a picture message, a voice message, a video message, and the like. The multimedia type is used to identify whether the detected user event is a picture message, a voice message, a video message, or the like. The manner of obtaining the multimedia type of the multimedia message and the multimedia identifier includes but is not limited to: parsing the detected multimedia message, and obtaining the multimedia type of the multimedia message and the multimedia identifier according to a parsing result.

When the multimedia message is a message of a different type, the event information also has different content. Specifically, there may be the following several cases:

1. When the multimedia message is a picture message, the event information may include the Internet application identifier, a picture message creation time, a message type, a picture link, a picture identifier, and a message identifier. As shown in Table 5, Table 5 shows specific content of event information when the detected user event is an event that the terminal sends a picture message to the third-party server.

TABLE 5

| Event information | Description |
|---|---|
| ToUserName | Public identifier |
| FromUserName | Internet application identifier, which may be an OpenID |
| CreateTime | Picture message creation time (integer type) |
| MsgType | Message type: image |
| PicUrl | Picture link |
| MediaId | Picture identifier, where data may be obtained by invoking a multimedia file download interface |

TABLE 5-continued

| Event information | Description |
|---|---|
| MsgId | Message identifier, which may be of a 64-bit integer type |

The "data may be obtained by invoking a multimedia file download interface" refers to that the Internet application server may obtain locally specific content of a picture according to a picture identifier. It should be noted that, the principle of content of multimedia identifiers involved in subsequent tables is consistent with the principle in this table, and details are not described below again.

According to the content in Table 5, the Internet application server may send the user event notification message by sending the following XML-format data packet to the third-party server:

```
"<xml>
  <ToUserName><![CDATA[toUser]]></ToUserName>
  <FromUserName><![CDATA[fromUser]]></FromUserName>
  <CreateTime>1348831860</CreateTime>
  <MsgType><![CDATA[image]]></MsgType>
  <PicUrl><![CDATA[this is a url]]></PicUrl>
  <MediaId><![CDATA[media_id]]></MediaId>
  <MsgId>1234567890123456</MsgId>
</xml>".
```

2. When the multimedia message is a voice message, the event information may include the Internet application identifier, a voice message creation time, a message type, a voice identifier, a voice format, and a message identifier. As shown in Table 6, Table 6 shows specific content of event information when the detected user event is an event that the terminal sends a voice message to the third-party server.

TABLE 6

| Event information | Description |
|---|---|
| ToUserName | Public identifier |
| FromUserName | Internet application identifier, which may be an OpenID |
| CreateTime | Voice message creation time (integer type) |
| MsgType | Message type: voice |
| MediaId | Voice identifier, where data may be obtained by invoking a multimedia file download interface |
| Format | Voice format, such as amr or speex |
| MsgID | Message identifier, which may be of a 64-bit integer type |

According to the content in Table 6, the Internet application server may send the user event notification message by sending the following XML-format data packet to the third-party server:

```
"<xml>
  <ToUserName><![CDATA[toUser]]></ToUserName>
  <FromUserName><![CDATA[fromUser]]></FromUserName>
  <CreateTime>1357290913</CreateTime>
  <MsgType><![CDATA[voice]]></MsgType>
  <MediaId><![CDATA[media_id]]></MediaId>
  <Format><![CDATA[Format]]></Format>
  <MsgId>1234567890123456</MsgId>
</xml>".
```

3. When the multimedia message is a video message, the event information may include the Internet application identifier, a video message creation time, a message type, a video identifier, a video message thumbnail identifier, and a message identifier. As shown in Table 7, Table 7 shows specific content of event information when the detected user event is an event that the terminal sends a video message to the third-party server.

TABLE 7

| Event information | Description |
|---|---|
| ToUserName | Internet application identifier |
| FromUserName | Public identifier, which may be an OpenID |
| CreateTime | Video message creation time, which may be of an integer type |
| MsgType | Message type: video |
| MediaId | Video identifier, where data may be obtained by invoking a multimedia file download interface |
| ThumbMediaId | Video message thumbnail identifier, where data may be obtained by invoking a multimedia file download interface |
| MsgId | Message identifier, which is of a 64-bit integer type |

According to the content in Table 7, the Internet application server may send the user event notification message by sending the following XML-format data packet to the third-party server:

```
"<xml>
<ToUserName><![CDATA[toUser]]></ToUserName>
<FromUserName><![CDATA[fromUser]]></FromUserName>
<CreateTime>1357290913</CreateTime>
<MsgType><![CDATA[video]]></MsgType>
<MediaId><![CDATA[media_id]]></MediaId>
<ThumbMediaId><![CDATA[thumb_media_id]]></ThumbMediaId>".
```

Third case: The detected user event is an event that the terminal sends a geographical location message to the third-party server. In this case, to enable the third-party server to learn a current geographical location of the terminal, the event information needs to include the current geographical location of the terminal. Specifically, when the detected user event is an event that the terminal sends a geographical location message to the third-party server, the Internet application server may obtain geographical location information of the terminal, and use the geographical location information as the event information; and send, to the third-party server according to the public identifier, the user event notification message carrying at least the geographical location information. The manner of obtaining, by the Internet application server, geographical location information of the terminal includes but is not limited to: parsing the geographical location message, and obtaining the geographical location information of the terminal according to a parsing result.

In this case, the event information may include the Internet application identifier, a geographical location message creation time, a message type, a geographical location longitude, a geographical location latitude, a map scale, the geographical location information, and a message identifier. As shown in Table 8, Table 8 shows specific content of event information when the detected user event is an event that the terminal sends a geographical location message to the third-party server.

TABLE 8

| Event information | Description |
|---|---|
| ToUserName | Public identifier |
| FromUserName | Internet application identifier, which may be an OpenID |

TABLE 8-continued

| Event information | Description |
|---|---|
| CreateTime | Geographical location message creation time (integer type) |
| MsgType | Message type: location |
| Location_X | Geographical location latitude |
| Location_Y | Geographical location longitude |
| Scale | Map scale |
| Label | Geographical location information |
| MsgId | Message identifier, which is of a 64-bit integer type |

According to the content in Table 8, the Internet application server may send the user event notification message by sending the following XML-format data packet to the third-party server:

```
"<xml>
<ToUserName><![CDATA[toUser]]></ToUserName>
<FromUserName><![CDATA[fromUser]]></FromUserName>
<CreateTime>1351776360</CreateTime>
<MsgType><![CDATA[location]]></MsgType>
<Location_X>23.134521</Location_X>
<Location_Y>113.358803</Location_Y>
<Scale>20</Scale>
<Label><![CDATA[location information]]></Label>
<MsgId>1234567890123456</MsgId>
</xml>".
```

Fourth case: The detected user event is an event that the terminal sends a link message to the third-party server. In this case, to enable the third-party server to learn a specific link address of the link message, the event information needs to include at least the link address of the link message. In this case, when the detected user event is an event that the terminal sends a link message to the third-party server, the Internet application server needs to obtain the link address of the link message, and use the link address as the event information; and send, to the third-party server according to the public identifier, the user event notification message carrying at least the link address. The manner of obtaining, by the Internet application server, the link address of the link message includes but is not limited to: parsing the link message, and obtaining the link address of the link message according to a parsing result. The link address may be a universal resource locator (URL).

In this case, the event information may include the Internet application identifier, a link message creation time, a message type, a message title, a message description, a message link, and a message identifier. As shown in Table 9, Table 9 shows specific content of event information when the detected user event is an event that the terminal sends a link message to the third-party server.

TABLE 9

| Event information | Description |
|---|---|
| ToUserName | Public identifier |
| FromUserName | Internet application identifier, which may be an OpenID |
| CreateTime | Link message creation time |
| MsgType | Message type: link |
| Title | Message title |
| Description | Message description |
| Url | Message link |
| MsgId | Message identifier, which is of a 64-bit integer type |

According to the content in Table 9, the Internet application server may send the user event notification message by sending the following XML-format data packet to the third-party server:

```
"<xml>
  <ToUserName><![CDATA[toUser]]></ToUserName>
  <FromUserName><![CDATA[fromUser]]></FromUserName>
  <CreateTime>1351776360</CreateTime>
  <MsgType><![CDATA[link]]></MsgType>
  <Title><![CDATA[link of official website of public
platform]]></Title>
  <Description><![CDATA[link of official website of public
platform]]></Description>
  <Url><![CDATA[url]]></Url>
  <MsgId>1234567890123456</MsgId>
</xml>".
```

Fifth case: The detected user event is an operation that is executed by the terminal and that is related to the third-party server. The operation may be an operation that the terminal subscribes to the public identifier corresponding to the third-party server, or may be an operation that the terminal unsubscribes to the public identifier corresponding to the third-party server, or may be an operation that the terminal scans a related two-dimensional code provided by the third-party server or the like. Regardless of the operation, when the Internet application server sends the user event notification message to the third-party server according to the public identifier, to enable the third-party server to learn a specific type of the operation, the event information needs to include at least an operation type. In this case, when the detected user event is an operation that is executed by the terminal and that is related to the third-party server, the Internet application server may obtain an operation type of the operation, and use the operation type as the event information; and send, to the third-party server according to the public identifier, the user event notification message carrying at least the operation type. The manner of obtaining, by the Internet application server, an operation type may be implemented according to a specific operation when the terminal triggers the user event, and is not specifically limited in this embodiment of the present disclosure.

Specifically, when the detected user event is a different operation with respect to the third-party server, the event information and the manner of sending, by the Internet application server, a user event notification message to the third-party server according to the public identifier are also different. For details, refer to the following several cases:

1. When the detected user event is a subscription-related operation that the terminal subscribes to the public identifier corresponding to the third-party server, the event information may include the Internet application identifier, a subscription event message creation time, a message type, and an event type. As shown in Table 10, Table 10 shows specific content of event information when an operation is a subscription operation.

TABLE 10

| Event information | Description |
| --- | --- |
| ToUserName | Public identifier |
| FromUserName | Internet application identifier, which may be an OpenID |
| CreateTime | Subscription event message creation time (integer type) |
| MsgType | Message type: event |
| Event | Event type: subscribe, unsubscribe |

According to the content in Table 10, the Internet application server may send the user event notification message by sending the following XML-format data packet to the third-party server:

```
"<xml>
  <ToUserName><![CDATA[toUser]]></ToUserName>
  <FromUserName><![CDATA[FromUser]]></FromUserName>
  <CreateTime>123456789</CreateTime>
  <MsgType><![CDATA[event]]></MsgType>
  <Event><![CDATA[subscribe]]></Event>
</xml>".
```

2. When the detected user event is an operation that the terminal scans a related two-dimensional code provided by the third-party server, the event information may include the Internet application identifier, a two-dimensional code scan event message creation time, a message type, an event type, and content of the two-dimensional code scanned by the terminal. As shown in Table 10, Table 10 shows specific content of event information when the detected user event is that the terminal subscribes to, by scanning a two-dimensional code, the public identifier corresponding to the third-party server when the user corresponding to the terminal has not subscribed to the public identifier corresponding to the third-party server.

TABLE 11

| Event information | Description |
| --- | --- |
| ToUserName | Public identifier |
| FromUserName | Internet application identifier, which may be an OpenID |
| CreateTime | Two-dimensional code scan event message creation time (integer type) |
| MsgType | Message type: event |
| Event | Event type: subscribe |
| EventKey | Event KEY value, where qrscene_ is a prefix, followed by a parameter value of a two-dimensional code, which is used to identify content of a two-dimensional code |
| Ticket | Ticket of the two-dimensional code, which may be used to generate a two-dimensional code picture |

According to the content in Table 11, the Internet application server may send the user event notification message by sending the following XML-format data packet to the third-party server:

```
"<xml><ToUserName><![CDATA[toUser]]></ToUserName>
  <FromUserName><![CDATA[FromUser]]></FromUserName>
  <CreateTime>123456789</CreateTime>
  <MsgType><![CDATA[event]]></MsgType>
  <Event><![CDATA[subscribe]]></Event>
  <EventKey><![CDATA[qrscene_123123]]></EventKey>
  <Ticket><![CDATA[TICKET]]></Ticket>
</xml>".
```

3. When the detected user event is an operation that the terminal scans a related two-dimensional code provided by the third-party server, if the user has subscribed to the public identifier corresponding to the third-party server, the user event may be another operation executed by the terminal by scanning the two-dimensional code. In this case, the event information may include the Internet application identifier, a two-dimensional code scan event message creation time, a message type, an event type, and content of the two-dimensional code scanned by the terminal. As shown in Table 12, Table 12 shows specific content of event information when the detected user event is that the terminal executes, by scanning a two-dimensional code, an operation related to the third-party server when the user corresponding to the terminal has subscribed to the third-party server.

TABLE 12

| Event information | Description |
| --- | --- |
| ToUserName | Public identifier |
| FromUserName | Internet application identifier, which may be an OpenID |
| CreateTime | Message creation time (integer type) |
| MsgType | Message type: event |
| Event | Event type: SCAN |
| EventKey | Event KEY value, which is a 32-bit unsigned integer, that is, scene_id (scene value) of a two-dimensional code when the two-dimensional code is created |
| Ticket | Ticket of the two-dimensional code, which may be used to generate a two-dimensional code picture |

According to the content in Table 12, the Internet application server may send the user event notification message by sending the following XML-format data packet to the third-party server:

```
"<xml>
  <ToUserName><![CDATA[toUser]]></ToUserName>
  <FromUserName><![CDATA[FromUser]]></FromUserName>
  <CreateTime>123456789</CreateTime>
  <MsgType><![CDATA[event]]></MsgType>
  <Event><![CDATA[SCAN]]></Event>
  <EventKey><![CDATA[SCENE_VALUE]]></EventKey>
  <Ticket><![CDATA[TICKET]]></Ticket>
</xml>".
```

4. The detected user event is a customize menu event. The customize menu event is a service option preset by the third-party server in services provided by the third-party server. By means of the customize menu, the user corresponding to the terminal may enjoy specific content of a service provided by the third-party server. The user may click the customize menu to obtain specific content included in a menu from the third-party server, or may switch to another page by clicking the customize menu. Specific content of the event information and the manner of sending, by the Internet application server, a user event notification message to the third-party server according to the public identifier when the detected user event belongs to the foregoing two cases are specifically described below.

4.1. The detected user event is that the user clicks, by using the terminal, a menu in the customize menu provided by the third-party server, to obtain content in the menu. The event information includes the Internet application identifier, a customize menu click message creation time, a message type, an event type, and an event key value. The event key value is a parameter value corresponding to the menu clicked by the user. As shown in Table 13, Table 13 shows specific content of event information when the detected user event is an operation that the user clicks, by using the terminal, a menu in the customize menu provided by the third-party server.

TABLE 13

| Event information | Description |
| --- | --- |
| ToUserName | Public identifier |
| FromUserName | Internet application identifier, which may be an OpenID |
| CreateTime | Customize menu click message creation time (integer type) |
| MsgType | Message type: event |
| Event | Event type: CLICK |
| EventKey | Event key value, which corresponds to a KEY value in a customize menu interface |

According to the content in Table 13, the Internet application server may send the user event notification message by sending the following XML-format data packet to the third-party server:

```
"<xml>
  <ToUserName><![CDATA[toUser]]></ToUserName>
  <FromUserName><![CDATA[FromUser]]></FromUserName>
  <CreateTime>123456789</CreateTime>
  <MsgType><![CDATA[event]]></MsgType>
  <Event><![CDATA[CLICK]]></Event>
  <EventKey><![CDATA[EVENTKEY]]></EventKey>
</xml>".
```

4.2. The detected user event is that the user clicks, by using the terminal, a menu in the customize menu provided by the third-party server, to switch to another page. The event information includes the Internet application identifier, a customize menu click and page switch message creation time, a message type, an event type, and an event key value. As shown in Table 14, Table 14 shows specific content of event information when the detected user event is an operation that the user clicks, by using the terminal, a menu in the customize menu provided by the third-party server, to switch to another page.

TABLE 14

| Event information | Description |
| --- | --- |
| ToUserName | Public identifier |
| FromUserName | Internet application identifier, which may be an OpenID |
| CreateTime | Customize menu click and page switch message creation time (integer type) |
| MsgType | Message type: event |
| Event | Event type: VIEW |
| EventKey | Event KEY value, which is a switch URL that is set |

According to the content in Table 14, the Internet application server may send the user event notification message by sending the following XML-format data packet to the third-party server:

```
"<xml>
  <ToUserName><![CDATA[toUser]]></ToUserName>
  <FromUserName><![CDATA[FromUser]]></FromUserName>
  <CreateTime>123456789</CreateTime>
  <MsgType><![CDATA[event]]></MsgType>
  <Event><![CDATA[VIEW]]></Event>
  <EventKey><![CDATA[www.qq.com]]></EventKey>
</xml>".
```

Sixth case: The detected user event is an event that the terminal reports a geographical location. The event that the terminal reports a geographical location is that when the terminal logs in to the third-party server on the Internet application server, after the terminal starts a positioning service, the terminal reports geographical location information to the third-party server by using the Internet application server. In this case, to enable the third-party server to learn a current geographical location of the terminal, the event information needs to include at least the geographical location information of the terminal. In this case, when the Internet application server sends the user event notification message to the third-party server according to the public identifier, when the detected user event is an event that the terminal reports a geographical location, the Internet application server may obtain the geographical location information of the terminal, and use the geographical location information as the event information; and send, to the third-party server according to the public identifier, the user event notification message carrying at least the geographical location information. The Internet application server may obtain the geographical location information of the terminal by using a global positioning system (GPS).

In this case, the event information may include the Internet application identifier, a geographical location report event message creation time, a message type, an event type, a geographical location latitude, a geographical location longitude, and a geographical location precision. As shown in Table 15, Table 15 shows specific content of event information when the detected user event is an event that the terminal reports a geographical location to the third-party server.

TABLE 15

| Event information | Description |
| --- | --- |
| ToUserName | Public identifier |
| FromUserName | Internet application identifier, which may be an OpenID |
| CreateTime | Geographical location report message creation time (integer type) |
| MsgType | Message type: event |
| Event | Event type: LOCATION |
| Latitude | Geographical location latitude |
| Longitude | Geographical location longitude |
| Precision | Geographical location precision |

According to the content in Table 15, the Internet application server may send the user event notification message by sending the following XML-format data packet to the third-party server:

```
"<xml>
    <ToUserName><![CDATA[toUser]]></ToUserName>
    <FromUserName><![CDATA[fromUser]]></FromUserName>
    <CreateTime>123456789</CreateTime>
    <MsgType><![CDATA[event]]></MsgType>
    <Event><![CDATA[LOCATION]]></Event>
    <Latitude>23.137466</Latitude>
    <Longitude>113.352425</Longitude>
    <Precision>119.385040</Precision>
</xml>".
```

Optionally, to ensure that the third-party server can respond to the detected user event in time, after sending the user event notification message to the third-party server according to the public identifier, the Internet application server may further determine whether a user event response message returned by the third-party server is received within a first preset time. If no user event response message sent by the third-party server is received within the first preset time, the user event notification message may be re-sent to the third-party server, until a quantity of times of sending the user event notification message reaches a preset quantity of times or a user event response message sent by the third-party server is received. The specific values of the first preset time and the preset quantity of times are not specifically limited in this embodiment of the present disclosure. For example, the first preset time may be 2 minutes or 3 minutes. The preset quantity of times may be 3 or 5.

Optionally, the third-party server may further preset a message responding manner when a response to the detected user event cannot be made in time. For example, the third-party server may set that a blank message may be returned to the Internet application server when a response to the detected user event cannot be made in time. On that basis, when the Internet application server receives the blank message, the Internet application server does not need to re-send the user event notification message to the third-party server. According to the content above, before re-sending the user event notification message to the third-party server, the Internet application server may first determine whether a blank message sent by the third-party server is received. If the Internet application server receives a blank message sent by the third-party server, the Internet application server cancels the re-sending the user event notification message to the third-party server. In such a manner, the Internet application server can be prevented from continuously re-sending the user event notification message to the third-party server when no user event response message sent by the third-party server is received, and a resource of the Internet application server can be saved.

Each time the Internet application server re-sends the user event notification message, the Internet application server records an identifier of the user event notification message once. By means of the identifier of the user event notification message, the Internet application server may determine the quantity of times of re-sending the user event notification message to the third-party server. Further, the Internet application server may determine, according to a quantity of times of recoding the identifier of the user event notification message, whether the quantity of times of re-sending the user event notification message reaches the preset quantity of times; and if the quantity of times of re-sending the user event notification message reaches the preset quantity of times, stop the re-sending the user event notification message to the third-party server.

The specific content of the identifier of the user event notification message is not specifically limited in this embodiment of the present disclosure. For example, the identifier of the user event notification message may be a message identifier, or may be a combination of the Internet application identifier and a message creation time.

Optionally, if the Internet application server receives, within a second preset time, no user event response message sent by the third-party server, to ensure that a response message still can be returned to the terminal, in this case, after sending the user event notification message to the third-party server according to the public identifier, the Internet application server may further determine whether a user event response message sent by the third-party server is received within the second preset time. If no user event response message sent by the third-party server is received within the second preset time, the Internet application server may send a preset system prompt message to the terminal.

Optionally, if data carried in a user event response message that is sent by the third-party server and that is received by the Internet application server is abnormal, after sending the user event notification message to the third-party server according to the public identifier, the Internet application server may send a preset system prompt message to the terminal. Specifically, if data carried in a received user event response message sent by the third-party server is abnormal, the Internet application server sends a preset system prompt message to the terminal. When data sent by the third-party server to the Internet application server does not conform to an interaction protocol preset between the Internet application server and the third-party server, the Internet application server may determine that the data carried in the user event response message sent by the third-party server is abnormal. For example, data that conforms to the interaction protocol preset between the Internet application server and the third-party server is XML data described above. In this case, if data that is sent by the third-party server and that is received by the Internet application server is data other than the XML data (for example, JSON data), the Internet application server may determine that the data carried in the received user event response message sent by the third-party server is abnormal, and may send the preset system prompt message to the terminal.

The specific content of the system prompt message is not specifically limited in this embodiment of the present disclosure. For example, the content of the system prompt message may be "The third-party server temporarily cannot provide a service. Please try again later". The specific value of the second preset time is not specifically limited in this embodiment of the present disclosure. For example, the second preset time may be 30 seconds or 1 minute.

703: Receive a user event response message sent by the third-party server, where the user event response message carries a responding manner determined by the third-party server for the response message corresponding to the detected user event, and the responding manner is determined by the third-party server according to the event information and a preset mapping relationship between a user event and a response message.

Generally, the third-party server may respond to the user event by returning a text message or a multimedia message to the terminal. The responding manner herein is a manner that can identify which message type is used by the third-party server to respond to the detected user event.

For the content of the mapping relationship between a user event and a response message, refer to the content in the embodiment corresponding to FIG. 3. Details are not described herein again. It should be noted that, when setting the mapping relationship between a user event and a response message, the third-party server may further set a responding manner for a response message corresponding to each user event.

The manner of determining, by the third-party server according to the event information and the preset mapping relationship between a user event and a response message, a responding manner corresponding to the detected user event includes but is not limited to: determining the detected user event according to the event information; query the preset mapping relationship between a user event and a response message according to the detected user event, to obtain a response message corresponding to the detected user event; and query preset responding manners for the response message corresponding to the detected user event, to obtain the responding manner for the response message corresponding to the detected user event.

704: Generate the response message according to the responding manner.

When the Internet application server generates the response message according to the responding manner, according to different responding manners, the manner of generating the response message is also different. For details, refer to the following two cases:

First case: When the responding manner is responding by means of a text message, when the Internet application server generates the response message according to the responding manner, because the text message occupies little storage space and the Internet application server does not need many system resources to receive the text message from the third-party server, when the responding manner is responding by means of a text message, the Internet application server may receive a text response message sent by the third-party server, and directly use the text response message as the generated response message.

To enable the user corresponding to the terminal to know the response message is from which third-party server, a time at which the third-party server responds to the user event, and specific content of the response message, the response message may include the public identifier corresponding to the third-party server, a response message creation time, a response message type, and response message content. In addition, to know the response message is sent to which user, the response message may further include the Internet application identifier. As shown in Table 16, Table 16 shows content included in a response message. It should be noted that, in Table 16 and subsequent tables, "parameter" represents content carried in a response message, "necessary or not" indicates whether corresponding content needs to be carried in the response message, and "description" is a simple explanation of the content.

TABLE 16

| Parameter | Necessary or not | Description |
| --- | --- | --- |
| ToUserName | Yes | Internet application identifier, which may be an OpenID that triggers a user event |
| FromUserName | Yes | Public identifier |
| CreateTime | Yes | Response message creation time (integer type) |
| MsgType | Yes | Response message type: text |
| Content | Yes | Response message content |

According to the content in Table 16, the response message generated by the Internet application server may be the following XML-format data packet:

```
"<xml>
   <ToUserName><![CDATA[toUser]]></ToUserName>
   <FromUserName><![CDATA[fromUser]]></FromUserName>
   <CreateTime>12345678</CreateTime>
   <MsgType><![CDATA[text]]></MsgType>
   <Content><![CDATA[你好]]></Content>
</xml>".
```

Second case: When the responding manner is responding by means of a multimedia message, when the Internet application server generates the response message according to the responding manner, because the multimedia message occupies large storage space and the Internet application server needs to use many system resources and a long time to receive the multimedia message from the third-party server, in this embodiment of the present disclosure, the third-party server may upload in advance a multimedia file to the Internet application server, and when sending a user event response message to the Internet application server, add an identifier of the multimedia file to the user event response message, and the Internet application server generates a multimedia message after locally obtaining the multimedia file according to the identifier of the multimedia file.

Specifically, when the responding manner is responding by means of a multimedia message, the manner of generating, by the Internet application server, the response message includes but is not limited to: receiving an identifier of a multimedia file that is sent by the third-party server, where the identifier of the multimedia file is carried in a user event response message; obtaining a pre-stored multimedia file according to the identifier of the multimedia file; and generating the response message according to the multimedia file.

When generating the response message according to the multimedia file, the Internet application server may first locally obtain the multimedia file according to the multimedia identifier in the user event response message, and add the multimedia file to the generated response message.

The multimedia message generated by the Internet application server may be a picture message, a voice message, a video message, a music message, a news message, or the like. Content that needs to be carried in the response message generated by the Internet application server when the multimedia message carries different types of multimedia files is described below in detail.

1. When the multimedia message is a picture message, the response message generated by the Internet application server includes but is not limited to carrying the Internet application identifier, the public identifier, a response message creation time, a response message type, and a picture identifier. The Internet application server may obtain, locally according to the picture identifier, a picture that is uploaded by the third-party server in advance. As shown in Table 17, Table 17 shows content that needs to be carried in the response message generated by the Internet application server.

TABLE 17

| Parameter | Necessary or not | Description |
| --- | --- | --- |
| ToUserName | Yes | Internet application identifier, which may be an OpenID that triggers a user event |
| FromUserName | Yes | Public identifier |
| CreateTime | Yes | Response message creation time (integer type) |
| MsgType | Yes | Response message type: image |
| MediaId | Yes | Picture identifier |

The Internet application server may locally obtain specific content of the picture according to the picture identifier carried in the user event response message, and when subsequently generating the response message, add the picture content to the response message. It should be noted that, the principle of multimedia identifiers mentioned in subsequent tables is consistent with the principle of the picture identifier, and details are not described below again.

According to the content in Table 17, the response message generated by the Internet application server may be the following XML-format data packet:

```
"<xml>
    <ToUserName><![CDATA[toUser]]></ToUserName>
    <FromUserName><![CDATA[fromUser]]></FromUserName>
    <CreateTime>12345678</CreateTime>
    <MsgType><![CDATA[image]]></MsgType>
    <Image>
    <MediaId><![CDATA[media_id]]></MediaId>
    </Image>
    </xml>".
```

2. When the multimedia message is a voice message, the response message generated by the Internet application server includes but is not limited to carrying the Internet application identifier, the public identifier, a response message creation time, a response message type, and a voice identifier. The Internet application server may obtain, locally according to the voice identifier, a voice that is uploaded by the third-party server in advance. As shown in Table 18, Table 18 shows content that needs to be carried in the response message generated by the Internet application server.

TABLE 18

| Parameter | Necessary or not | Description |
| --- | --- | --- |
| ToUserName | Yes | Internet application identifier, which may be an OpenID that triggers a user event |
| FromUserName | Yes | Public identifier |
| CreateTime | Yes | Message creation time (integer type) |
| MsgType | Yes | Response message type: voice |
| MediaId | Yes | Voice identifier |

According to the content in Table 18, the response message generated by the Internet application server may be the following XML-format data packet:

```
"<xml>
    <ToUserName><![CDATA[toUser]]></ToUserName>
    <FromUserName><![CDATA[fromUser]]></FromUserName>
    <CreateTime>12345678</CreateTime>
    <MsgType><![CDATA[voice]]></MsgType>
    <Voice>
    <MediaId><![CDATA[media_id]]></MediaId>
    </Voice>
    </xml>".
```

3. When the multimedia message is a video message, the response message generated by the Internet application server includes but is not limited to carrying the Internet application identifier, the public identifier, a response message creation time, a response message type, a video identifier, a video message title, a video message description, and the like. The Internet application server may obtain, locally according to the video identifier, a video that is uploaded by the third-party server in advance. As shown in Table 19, Table 19 shows content that needs to be carried in the response message generated by the Internet application server.

TABLE 19

| Parameter | Necessary or not | Description |
| --- | --- | --- |
| ToUserName | Yes | Internet application identifier, which may be an OpenID that triggers a user event |
| FromUserName | Yes | Public identifier |
| CreateTime | Yes | Message creation time (integer type) |
| MsgType | Yes | Response message type: video |
| MediaId | Yes | Video identifier |

TABLE 19-continued

| Parameter | Necessary or not | Description |
|---|---|---|
| Title | No | Video message title |
| Description | No | Video message description |

According to the content in Table 19, the response message generated by the Internet application server may be the following XML-format data packet:

```
"<xml>
<ToUserName><![CDATA[toUser]]></ToUserName>
<FromUserName><![CDATA[fromUser]]></FromUserName>
<CreateTime>12345678</CreateTime>
<MsgType><![CDATA[video]]></MsgType>
<Video>
<MediaId><![CDATA[media_id]]></MediaId>
<Title><![CDATA[title]]></Title>
<Description><![CDATA[description]]></Description>
</Video>
</xml>".
```

4. When the multimedia message is a music message, the response message generated by the Internet application server includes but is not limited to carrying the Internet application identifier, the public identifier, a response message creation time, a response message type, a music identifier, a music title, a music description, a music link, a high-quality music link, and the like. The Internet application server may obtain, locally according to the music identifier, a music that is uploaded by the third-party server in advance. As shown in Table 20, Table 20 shows content that needs to be carried in the response message generated by the Internet application server.

TABLE 20

| Parameter | Necessary or not | Description |
|---|---|---|
| ToUserName | Yes | Internet application identifier, which may be an OpenID that triggers a user event |
| FromUserName | Yes | Public identifier |
| CreateTime | Yes | Message creation time (integer type) |
| MsgType | Yes | Response message type: music |
| Title | No | Music title |
| Description | No | Music description |
| MusicURL | No | Music link |
| HQMusicUrl | No | High-quality music link (the link is preferentially used to play music when in a WiFi environment) |
| ThumbMediaId | Yes | Music identifier |

According to the content in Table 20, the response message generated by the Internet application server may be the following XML-format data packet:

```
"<xml>
<ToUserName><![CDATA[toUser]]></ToUserName>
<FromUserName><![CDATA[fromUser]]></FromUserName>
<CreateTime>12345678</CreateTime>
<MsgType><![CDATA[music]]></MsgType>
<Music>
<Title><![CDATA[TITLE]]></Title>
<Description><![CDATA[DESCRIPTION]]></Description>
<MusicUrl><![CDATA[MUSIC_Url]]></MusicUrl>
<HQMusicUrl><![CDATA[HQ_MUSIC_Url]]></HQMusicUrl>
<ThumbMediaId><![CDATA[media_id]]></ThumbMediaId>
</Music>
</xml>".
```

5. When the multimedia message is a news message, the response message generated by the Internet application server includes but is not limited to carrying the Internet application identifier, the public identifier, a response message creation time, a response message type, a news quantity, multi-news messages information, a news message title, a news message description, a music link, and a news message click and switch link, and the like. The multi-news messages information may be a combination or an arrangement of multiple pieces of news. As shown in Table 21, Table 21 shows content that needs to be carried in the response message generated by the Internet application server.

TABLE 21

| Parameter | Necessary or not | Description |
|---|---|---|
| ToUserName | Yes | Internet application identifier, which may be an OpenID that triggers a user event |
| FromUserName | Yes | Public identifier |
| CreateTime | Yes | Message creation time (integer type) |
| MsgType | Yes | Response message type: news |
| ArticleCount | Yes | News quantity, which may be limited to 10 |
| Articles | Yes | Multi-news messages information, where it is defaulted that a large picture is displayed for the first item |
| Title | No | News message title |
| Description | No | News message description |
| PicUrl | No | Picture link, where JPG and PNG formats are supported, and a news size may be 360 * 200, 200 * 200, or the like |
| Url | No | News message click and switch link |

According to the content in Table 21, the response message generated by the Internet application server may be the following XML-format data packet:

```
"<xml>
<ToUserName><![CDATA[toUser]]></ToUserName>
<FromUserName><![CDATA[fromUser]]></FromUserName>
<CreateTime>12345678</CreateTime>
<MsgType><![CDATA[news]]></MsgType>
<ArticleCount>2</ArticleCount>
<Articles>
<item>
<Title><![CDATA[title1]]></Title>
<Description><![CDATA[description1]]></Description>
<PicUrl><![CDATA[picurl]]></PicUrl>
<Url><![CDATA[url]]></Url>
</item>
<item>
<Title><![CDATA[title]]></Title>
<Description><![CDATA[description]]></Description>
<PicUrl><![CDATA[picurl]]></PicUrl>
<Url><![CDATA[url]]></Url>
</item>
</Articles>
</xml>".
```

705: Return the obtained response message to the terminal corresponding to the Internet application identifier.

The principle of this step is consistent with that of step 304. For details, refer to the content in step 304. Details are not described herein again.

In the method provided in this embodiment of the present disclosure, after a user event that is triggered by a terminal with respect to a third-party server by using an Internet application server is detected, a response message corresponding to the detected user event is obtained according to a mapping relationship between a user event and a response message, and the response message is returned to the terminal. This implements a manner of automatically returning a response message to a terminal based on an Internet application server and makes a user event responding manner independent of manual work, which can reduce responding costs and improve responding efficiency.

Figure 8:
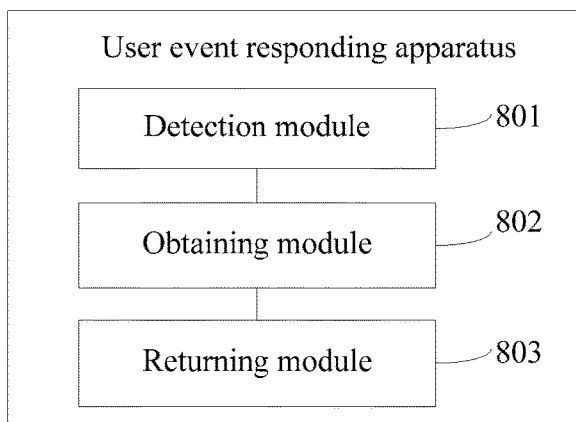
FIG. 8 is a schematic structural diagram of a user event responding apparatus according to another embodiment of the present disclosure.

FIG. 8 is a schematic structural diagram of a user event responding apparatus according to another embodiment of the present disclosure. The apparatus may be configured to implement functions implemented by an Internet application server in the user event responding method provided in any one of the embodiments corresponding to FIG. 2, FIG. 3, and FIG. 7. The apparatus is applied to a scenario in which a terminal interacts with a third-party server based on an Internet application server. Referring to FIG. 8, the apparatus includes:

a detection module 801, configured to detect a user event that is triggered by the terminal with respect to the third-party server by using the Internet application server, the user event carrying an Internet application identifier and a public identifier of the third-party server;

an obtaining module 802, configured to obtain, according to the public identifier, a response message corresponding to the detected user event, the response message being determined according to a mapping relationship between a user event and a response message; and a returning module 803, configured to return the obtained response message to a terminal corresponding to the Internet application identifier.

In another embodiment, the obtaining module 802 includes:

a first obtaining unit, configured to obtain, according to the public identifier, the mapping relationship between a user event and a response message that is preset by the third-party server; and a query unit, configured to query the mapping relationship according to the detected user event, and use the response message corresponding to the detected user event in the mapping relationship as the obtained response message.

In another embodiment, the first obtaining unit includes:

a first provision subunit, configured to provide an information obtaining interface to the third-party server according to the public identifier; and an obtaining subunit, configured to obtain the mapping relationship between a user event and a response message that is preset by the third-party server in the information obtaining interface.

In another embodiment, the detected user event is a detected social networking application message, the detected social networking application message is sent by the terminal to the third-party server, and the mapping relationship is a mapping relationship between a social networking application message and a response message; and the obtaining module 802 includes:

a second obtaining unit, configured to obtain, according to the public identifier, a mapping relationship between a social networking application message and a response message that corresponds to the third-party server; and a third obtaining unit, configured to obtain, according to the mapping relationship between a social networking application message and a response message, a response message corresponding to the detected social networking application message.

In another embodiment, the mapping relationship between a social networking application message and a response message is a mapping relationship between a keyword in a social networking application message and a response message; and the third obtaining unit includes:

a match subunit, configured to perform matching between the detected social networking application message and the keyword in the mapping relationship; and a first determining subunit, configured to: when the detected social networking application message matches any keyword in the mapping relationship, use a response message corresponding to the any keyword as the response message corresponding to the detected social networking application message.

In another embodiment, the first determining subunit is configured to use all response messages corresponding to the any keyword as response messages corresponding to the detected social networking application message; or select any one of all response messages corresponding to the any keyword as the response message corresponding to the detected social networking application message.

In another embodiment, the third obtaining unit further includes:

a second provision subunit, configured to provide, to the third-party server, a keyword setting interface for setting the mapping relationship between a keyword and a response message; and a first obtaining subunit, configured to obtain the mapping relationship between a keyword and a response message from the keyword setting interface, where one keyword corresponds to at least one response message.

In another embodiment, the match subunit is configured to:

when the detected social networking application message is consistent with any keyword in the mapping relationship, determine that the detected social networking application message matches the any keyword; or when the detected social networking application message includes any keyword in the mapping relationship, determine that the detected social networking application message matches the any keyword.

In another embodiment, the detected user event is a detected subscription-related operation, the subscription-related operation is an operation that is executed by a user corresponding to the terminal and that is related to the third-party server, and the mapping relationship is a mapping relationship between a subscription-related operation and a response message; and the obtaining module 802 includes:

a fourth obtaining unit, configured to obtain, according to the public identifier, a mapping relationship between a subscription-related operation and a response message that corresponds to the third-party server; and a fifth obtaining unit, configured to obtain, according to the mapping relationship between a subscription-related operation and a response message, a response message corresponding to the detected subscription-related operation.

In another embodiment, the obtaining module 802 includes:

a first sending unit, configured to send a user event notification message to the third-party server according to the public identifier, where the user event notification message carries at least event information of the detected user event;

a receiving unit, configured to receive a user event response message sent by the third-party server, where the user event response message carries a responding manner determined by the third-party server for the response message corresponding to the detected user event, and the responding manner is determined by the third-party server according to the event information and the preset mapping relationship between a user event and a response message; and a generation unit, configured to generate the response message according to the responding manner.

In another embodiment, the first sending unit is configured to: when the detected user event is an event that the terminal sends a text message to the third-party server, send the text message to the third-party server as the user event notification message according to the public identifier.

In another embodiment, the first sending unit is configured to: when the detected user event is an event that the terminal sends a multimedia message to the third-party server, obtain a multimedia type of the multimedia message and a multimedia identifier of a multimedia file carried in the multimedia message, and use the multimedia type and the multimedia identifier as the event information; and send, to the third-party server according to the public identifier, the user event notification message carrying at least the multimedia type and the multimedia identifier.

In another embodiment, the first sending unit is configured to: when the detected user event is an event that the terminal sends a geographical location message to the third-party server, obtain geographical location information of the terminal, and use the geographical location information as the event information; and send, to the third-party server according to the public identifier, the user event notification message carrying at least the geographical location information.

In another embodiment, the first sending unit is configured to: when the detected user event is an event that the terminal sends a link message to the third-party server, obtain a link address of the link message, and use the link address as the event information; and send, to the third-party server according to the public identifier, the user event notification message carrying at least the link address.

In another embodiment, the first sending unit is configured to: when the detected user event is an operation that is executed by the terminal and that is related to the third-party server, obtain an operation type of the operation, and use the operation type as the event information; and send, to the third-party server according to the public identifier, the user event notification message carrying at least the operation type.

In another embodiment, the first sending unit is configured to: when the detected user event is an event that the terminal reports a geographical location, obtain geographical location information of the terminal, and use the geographical location information as the event information; and send, to the third-party server according to the public identifier, the user event notification message carrying at least the geographical location information.

In another embodiment, the generation unit includes:

a first receiving subunit, configured to: when the responding manner is responding by means of a text message, receive a text response message sent by the third-party server, and a second determining subunit, configured to use the text response message as the generated response message.

In another embodiment, the generation unit includes:

a second receiving subunit, configured to: when the responding manner is responding by means of a multimedia message, receive an identifier of a multimedia file carried in a user event response message that is sent by the third-party server and that corresponds to the detected user event;

a second the obtaining subunit, configured to obtain a pre-stored multimedia file according to the identifier of the multimedia file; and a generation subunit, configured to generate the response message according to the multimedia file.

In another embodiment, the obtaining module further includes:

a re-sending unit, configured to: when no user event response message sent by the third-party server is received within a first preset time, re-send the user event notification message to the third-party server, until a quantity of times of sending the user event notification message reaches a preset quantity of times or a user event response message sent by the third-party server is received.

In another embodiment, the obtaining module 802 further includes:

a canceling unit, configured to: when a blank message sent by the third-party server is received, cancel the re-sending the user event notification message to the third-party server.

In another embodiment, the obtaining module 802 further includes:

a recording unit, configured to: each time the user event notification message is re-sent, record an identifier of the user event notification message once;

a determining unit, configured to determine, according to a quantity of times of recoding the identifier of the user event notification message, whether the quantity of times of re-sending the user event notification message reaches the preset quantity of times; and a stopping unit, configured to: when the quantity of times of re-sending the user event notification message reaches the preset quantity of times, stop the re-sending the user event notification message to the third-party server.

In another embodiment, the obtaining module 802 further includes:

a second sending unit, configured to: after the user event notification message is sent to the third-party server according to the public identifier, if no user event response message sent by the third-party server is received within a second preset time, send a preset system prompt message to the terminal.

In another embodiment, the obtaining module 802 further includes:

a third sending unit, configured to: after the user event notification message is sent to the third-party server according to the public identifier, if data carried in a received user event response message sent by the third-party server is abnormal, send a preset system prompt message to the terminal.

In the apparatus provided in this embodiment of the present disclosure, after a user event that is triggered by a terminal with respect to a third-party server by using an Internet application server is detected, a response message corresponding to the detected user event is obtained according to a mapping relationship between a user event and a response message, and the response message is returned to the terminal. This implements a manner of automatically returning a response message to a terminal based on an Internet application server and makes a user event responding manner independent of manual work, which can reduce responding costs and improve responding efficiency.

Figure 9:
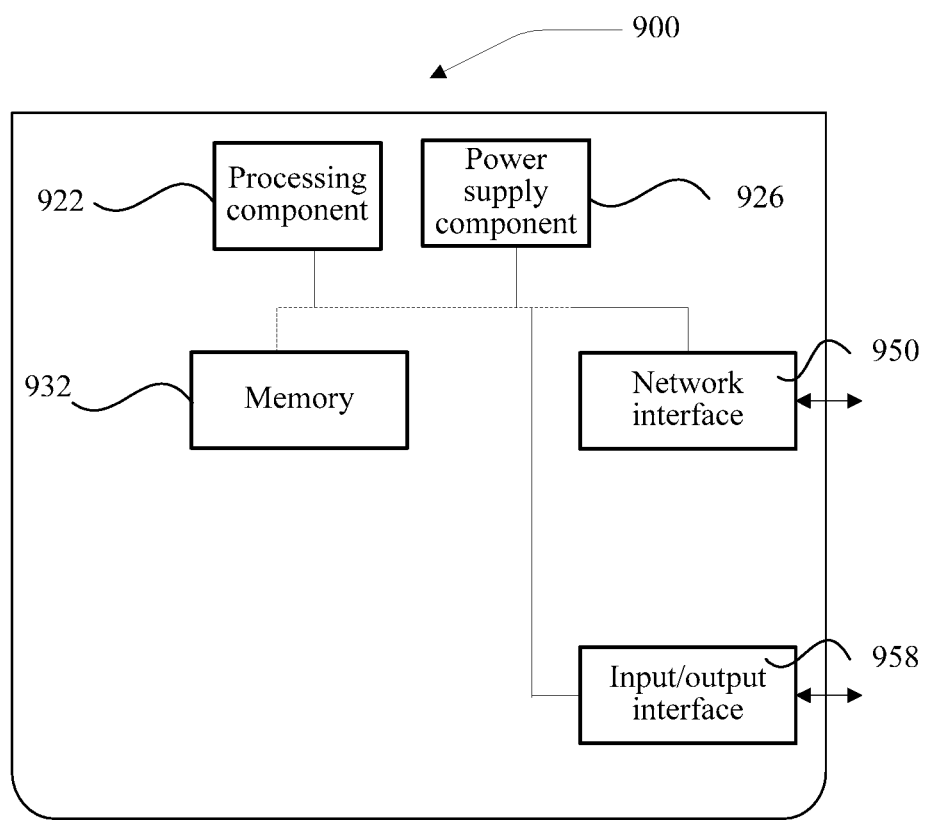
FIG. 9 is a schematic structural diagram of an Internet application server according to another embodiment of the present disclosure.

FIG. 9 is a schematic structural diagram of an Internet application server 900 according to an exemplary embodiment of the present disclosure. In some embodiments, the user event responding apparatus described above in connection with FIG. 8 is implemented in the Internet application server 900. Referring to FIG. 9, the Internet application server 900 includes: a processing component 922, which further includes one or more processors; and a memory resource represented by memory 932, configured to store instructions that can be executed by the processing component 922, for example, an application program like an instant messaging application or a social networking application. The application program stored in the memory 932 may include one or more program modules, each of which performs a set of operations. The memory 932 is non-transitory. Moreover, the processing component 922 is configured to execute the instruction, to execute the user event responding method provided in the embodiment corresponding to FIG. 2, FIG. 3 or FIG. 7.

The Internet application server 900 may further include: a power supply component 926, which may be configured to perform power supply management of the Internet application server 900; a wired or wireless network interface 950, configured to connect the Internet application server 900 to a network; and an input/output (I/O) interface 958. The Internet application server 900 may operate an operating system that is stored in the memory 932, for example, Windows Server™, Mac OS X™, Unix™, Linux™, or FreeBSD™.

One or more programs are stored in the memory, and are configured to be executed by the one or more processors. The one or more programs are applied to a scenario in which a terminal interacts with a third-party server based on the Internet application server, and include instructions used to execute the following operations:

detecting a user event that is triggered by the terminal with respect to the third-party server by using the Internet application server, the user event carrying an Internet application identifier and a public identifier of the third-party server;

obtaining, according to the public identifier, a response message corresponding to the detected user event, the response message being determined according to a mapping relationship between a user event and a response message; and returning the obtained response message to the terminal corresponding to the Internet application identifier.

Assuming that described above is a first possible implementation manner, in a second possible implementation manner provided based on the first possible implementation manner, the memory of the Internet application server further includes instructions used to execute the following operations: the obtaining, according to the public identifier, a response message corresponding to the detected user event includes:

obtaining, according to the public identifier, the mapping relationship between a user event and a response message that is preset by the third-party server; and querying the mapping relationship according to the detected user event, and using the response message corresponding to the detected user event in the mapping relationship as the obtained response message.

In a third possible implementation manner provided based on the second possible implementation manner, the memory of the Internet application server further includes instructions used to execute the following operations: the obtaining, according to the public identifier, the mapping relationship between a user event and a response message that is preset by the third-party server includes:

providing an information obtaining interface to the third-party server according to the public identifier; and obtaining the mapping relationship between a user event and a response message that is preset by the third-party server in the information obtaining interface.

In a fourth possible implementation manner provided based on the third possible implementation manner, the memory of the Internet application server further includes instructions used to execute the following operations: the detected user event is a detected social networking application message, the detected social networking application message is sent by the terminal to the third-party server, and the mapping relationship is a mapping relationship between a social networking application message and a response message; and the obtaining, according to the public identifier, a response message corresponding to the detected user event includes:

obtaining, according to the public identifier, a mapping relationship between a social networking application message and a response message that corresponds to the third-party server; and obtaining, according to the mapping relationship between a social networking application message and a response message, a response message corresponding to the detected social networking application message.

In a fifth implementation manner provided based on the fourth possible implementation manner, the memory of the Internet application server further includes instructions used to execute the following operations: the mapping relationship between a social networking application message and a response message is a mapping relationship between a keyword in a social networking application message and a response message; and the obtaining, according to the mapping relationship between a social networking application message and a response message, a response message corresponding to the detected social networking application message includes:

performing matching between the detected social networking application message and the keyword in the mapping relationship; and when the detected social networking application message matches any keyword in the mapping relationship, using a response message corresponding to the any keyword as the response message corresponding to the detected social networking application message.

In a sixth implementation manner provided based on the fifth possible implementation manner, the memory of the Internet application server further includes instructions used to execute the following operations: the using a response message corresponding to the any keyword as the response message corresponding to the detected social networking application message includes:

using all response messages corresponding to the any keyword as response messages corresponding to the detected social networking application message; or selecting any one of all response messages corresponding to the any keyword as the response message corresponding to the detected social networking application message.

In a seventh implementation manner provided based on the fifth or sixth possible implementation manner, the memory of the Internet application server further includes instructions used to execute the following operations: before the using a response message corresponding to the any keyword as the response message corresponding to the detected social networking application message, operations further include:

providing, to the third-party server, a keyword setting interface for setting the mapping relationship between a keyword and a response message; and obtaining the mapping relationship between a keyword and a response message from the keyword setting interface, where one keyword corresponds to at least one response message.

In an eighth implementation manner provided based on the fifth possible implementation manner, the memory of the Internet application server further includes instructions used to execute the following operations: the performing matching between the detected social networking application message and the keyword in the mapping relationship includes:

when the detected social networking application message is consistent with any keyword in the mapping relationship, determining that the detected social networking application message matches the any keyword; or when the detected social networking application message includes any keyword in the mapping relationship, determining that the detected social networking application message matches the any keyword.

In a ninth possible implementation manner provided based on the third possible implementation manner, the memory of the Internet application server further includes instructions used to execute the following operations: the detected user event is a detected subscription-related operation, the subscription-related operation is an operation that is executed by a user corresponding to the terminal and that is related to the third-party server, and the mapping relationship is a mapping relationship between a subscription-related operation and a response message; and the obtaining, according to the public identifier, a response message corresponding to the detected user event includes:

obtaining, according to the public identifier, a mapping relationship between a subscription-related operation and a response message that corresponds to the third-party server; and obtaining, according to the mapping relationship between a subscription-related operation and a response message, a response message corresponding to the detected subscription-related operation.

In a tenth possible implementation manner provided based on the first possible implementation manner, the memory of the Internet application server further includes instructions used to execute the following operations: the obtaining, according to the public identifier, a response message corresponding to the detected user event includes:

sending a user event notification message to the third-party server according to the public identifier, where the user event notification message carries at least event information of the detected user event;

receiving a user event response message sent by the third-party server, where the user event response message carries a responding manner determined by the third-party server for the response message corresponding to the detected user event, and the responding manner is determined by the third-party server according to the event information and the preset mapping relationship between a user event and a response message; and generating the response message according to the responding manner.

In an eleventh possible implementation manner provided based on the tenth possible implementation manner, the memory of the Internet application server further includes instructions used to execute the following operations: the sending a user event notification message to the third-party server according to the public identifier includes:

when the detected user event is an event that the terminal sends a text message to the third-party server, sending the text message to the third-party server as the user event notification message according to the public identifier.

In a twelfth possible implementation manner provided based on the tenth possible implementation manner, the memory of the Internet application server further includes instructions used to execute the following operations: the sending a user event notification message to the third-party server according to the public identifier includes:

when the detected user event is an event that the terminal sends a multimedia message to the third-party server, obtaining a multimedia type of the multimedia message and a multimedia identifier of a multimedia file carried in the multimedia message, and using the multimedia type and the multimedia identifier as the event information; and sending, to the third-party server according to the public identifier, the user event notification message carrying at least the multimedia type and the multimedia identifier.

In a thirteenth possible implementation manner provided based on the tenth possible implementation manner, the memory of the Internet application server further includes instructions used to execute the following operations: the sending a user event notification message to the third-party server according to the public identifier includes:

when the detected user event is an event that the terminal sends a geographical location message to the third-party server, obtaining geographical location information of the terminal, and using the geographical location information as the event information; and sending, to the third-party server according to the public identifier, the user event notification message carrying at least the geographical location information.

In a fourteenth possible implementation manner provided based on the tenth possible implementation manner, the memory of the Internet application server further includes instructions used to execute the following operations: the sending a user event notification message to the third-party server according to the public identifier includes:

when the detected user event is an event that the terminal sends a link message to the third-party server, obtaining a link address of the link message, and using the link address as the event information; and sending, to the third-party server according to the public identifier, the user event notification message carrying at least the link address.

In a fifteenth possible implementation manner provided based on the tenth possible implementation manner, the memory of the Internet application server further includes instructions used to execute the following operations: the sending a user event notification message to the third-party server according to the public identifier includes:

when the detected user event is an operation that is executed by the terminal and that is related to the third-party server, obtaining an operation type of the operation, and using the operation type as the event information; and sending, to the third-party server according to the public identifier, the user event notification message carrying at least the operation type.

In a sixteenth possible implementation manner provided based on the tenth possible implementation manner, the memory of the Internet application server further includes instructions used to execute the following operations: the sending a user event notification message to the third-party server according to the public identifier includes:

when the detected user event is an event that the terminal reports a geographical location, obtaining geographical location information of the terminal, and using the geographical location information as the event information; and sending, to the third-party server according to the public identifier, the user event notification message carrying at least the geographical location information.

In a seventeenth possible implementation manner provided based on the tenth possible implementation manner, the memory of the Internet application server further includes instructions used to execute the following operations: the generating the response message according to the responding manner includes:

when the responding manner is responding by means of a text message, receiving a text response message sent by the third-party server, and using the text response message as the generated response message.

In an eighteenth possible implementation manner provided based on the tenth possible implementation manner, the memory of the Internet application server further includes instructions used to execute the following operations: the generating the response message according to the responding manner includes:

when the responding manner is responding by means of a multimedia message, receiving an identifier of a multimedia file carried in a user event response message that is sent by the third-party server and that corresponds to the detected user event;

obtaining a pre-stored multimedia file according to the identifier of the multimedia file; and generating the response message according to the multimedia file.

In a nineteenth possible implementation manner provided based on the tenth possible implementation manner, the memory of the Internet application server further includes instructions used to execute the following operations: after the sending a user event notification message to the third-party server according to the public identifier, operations further include:

if no user event response message sent by the third-party server is received within a first preset time, re-sending the user event notification message to the third-party server, until a quantity of times of sending the user event notification message reaches a preset quantity of times or a user event response message sent by the third-party server is received.

In a twentieth possible implementation manner provided based on the nineteenth possible implementation manner, the memory of the Internet application server further includes instructions used to execute the following operations: before the re-sending the user event notification message to the third-party server, operations further include:

when a blank message sent by the third-party server is received, canceling the re-sending the user event notification message to the third-party server.

In a twenty-first possible implementation manner provided based on the nineteenth possible implementation manner, the memory of the Internet application server further includes instructions used to execute the following operations: before the re-sending the user event notification message to the third-party server, operations further include:

each time the user event notification message is re-sent, recording an identifier of the user event notification message once;

determining, according to a quantity of times of recoding the identifier of the user event notification message, whether the quantity of times of re-sending the user event notification message reaches the preset quantity of times; and if the quantity of times of re-sending the user event notification message reaches the preset quantity of times, stopping the re-sending the user event notification message to the third-party server.

In a twenty-second possible implementation manner provided based on the tenth possible implementation manner, the memory of the Internet application server further includes instructions used to execute the following operations: after the sending a user event notification message to the third-party server according to the public identifier, operations further include:

if no user event response message sent by the third-party server is received within a second preset time, sending a preset system prompt message to the terminal.

In a twenty-third possible implementation manner provided based on the tenth possible implementation manner, the memory of the Internet application server further includes instructions used to execute the following operations: after the sending a user event notification message to the third-party server according to the public identifier, operations further include:

if data carried in a received user event response message sent by the third-party server is abnormal, sending a preset system prompt message to the terminal.

In the Internet application server provided in this embodiment of the present disclosure, after a user event that is triggered by a terminal with respect to a third-party server by using the Internet application server is detected, a response message corresponding to the detected user event is obtained according to a mapping relationship between a user event and a response message, and the response message is returned to the terminal. This implements a manner of automatically returning a response message to a terminal based on the Internet application server and makes a user event responding manner independent of manual work, which can reduce responding costs and improve responding efficiency.

It should be noted that, when the user event responding apparatus provided in the foregoing embodiment responds to a user event, the foregoing division of the functional modules is merely an example for description. In practical application, the foregoing functions may be allocated to and completed by different functional modules as required, that is, an inner structure of the apparatus is divided into different functional modules, so as to complete all or some of the functions described above. In addition, the user event responding apparatus provided in the foregoing embodiment and the embodiments of the user event responding method belong to the same conception. For details of the specific implementation process of the apparatus, refer to the method embodiments. The details are not described herein again.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A user event responding method performed by a computer server having one or more processors and memory storing programs to be executed by the processors, wherein the computer server hosts a social networking application that includes a plurality of social network user accounts, including a user account associated with a terminal and a public account associated with a third-party service provider, the method comprising:
receiving a subscription request from the terminal to subscribe to the public account, the subscription request including identification of the public account associated with the third-party service provider and the user account associated with the terminal;
establishing a subscription relationship between the user account and the third-party service account on the social networking application, wherein the user account and the third-party service account are configured to exchange information using an instant messaging service on the social networking application through the subscription relationship;
configuring a set of auto-response rules for the subscription relationship in accordance with one or more parameters provided by the user account and the third-party service account, respectively, the configuring including:
providing, to the third-party service provider corresponding to the public account, an information obtaining interface that includes a subscription-based responding option; and
in accordance with selection of the subscription-based responding option by an employee of the third-party service provider, obtaining, from a third-party server associated with the third-party service, one or more mapping relationships preset by the third party server, each of the mapping relationships corresponding to a mapping between a subscription-related operation of the third-party service provider and a response message; and
configuring the set of auto-response rules in accordance with the mapping relationship;
detecting a message sent by the user account associated with the terminal to the public account associated with the third-party service provider via the instant messaging service of the social networking application;
identifying one or more keywords associated with the detected message;
obtaining, according to the set of auto-response rules, a response message corresponding to the detected message, wherein the response message is preset by the third-party service provider and selected based on (i) the one or more parameters provided by the user account and (ii) the one or more keywords; and
returning the obtained response message to the user account via the instant messaging service of the social networking application, wherein the obtained response message and the message sent by the user are displayed simultaneously on an instant messaging interface of the terminal.

2. The method according to claim 1, wherein:
the set of auto-response rules includes a plurality of candidate response messages, each candidate response message being associated with one or more keywords; and
obtaining the response message corresponding to the detected message comprises:
querying the set of auto-response rules with the one or more keywords to identify one or more candidate response messages corresponding to the one or more keywords;
ranking the identified one or more candidate response messages by the detected user event; and
choosing one of the candidate response messages of a highest ranking as the obtained response message.

3. The method according to claim 1, wherein obtaining the response message corresponding to the detected message comprises:
retrieving information from the Internet using the one or more keywords;
supplementing one or more candidate auto response determined by the set of auto-response rules with the retrieved information as the response message corresponding to the detected social networking application message.

4. The method according to claim 1, wherein each auto-response rule defines a mapping relationship between a keyword in a social networking application message and a candidate response message, and of obtaining the response message corresponding to the detected message comprises:
identifying multiple candidate response messages corresponding to different keywords in the detected social networking application message; and
compiling the multiple candidate response messages into one comprehensive response message as the response message corresponding to the detected social networking application message.

5. The method according to claim 1, wherein configuring the set of auto-response rules for the subscription relationship further comprises:
providing, to the third-party service provider corresponding to the public account, a keyword setting interface for setting a mapping relationship between a keyword and a candidate response message; and
obtaining a mapping relationship between a keyword and a response message from the keyword setting interface, wherein one keyword corresponds to at least one candidate response message.

6. The method according to claim 1, wherein obtaining the response message corresponding to the detected message comprises:
sending a user event notification message to the third-party service provider according to the public account, wherein the user event notification message carries at least event information of the detected message;
receiving a user event response message sent by the third-party service provider, wherein the user event response message carries a responding manner determined by the third-party service provider for the response message corresponding to the detected message, and the responding manner is determined by the third-party service provider according to the event information and a preset auto-response rule between a user event and a candidate response message; and
generating the response message according to the responding manner.

7. The method according to claim 6, wherein the detected message is a message selected from the group consisting of:

the terminal sending a text message to the public account associated with the third-party service provider, the terminal sending a multimedia message to the public account associated with the third-party service provider, and the terminal sending its current location to the public account associated with the third-party service provider.

8. A computer server comprising one or more processors, memory and a plurality of programs stored in the memory, wherein the computer server hosts a social networking application that includes a plurality of social network user accounts, including a user account associated with a terminal and a public account associated with a third-party service provider, wherein the programs, when executed by the one or more processors, cause the computer server to perform operations including:
 receiving a subscription request from the terminal to subscribe to the public account, the subscription request including identification of the public account associated with the third-party service provider and the user account associated with the terminal;
 establishing a subscription relationship between the user account and the third-party service account on the social networking application, wherein the user account and the third-party service account are configured to exchange information using an instant messaging service on the social networking application through the subscription relationship;
 configuring a set of auto-response rules for the subscription relationship in accordance with one or more parameters provided by the user account and the third-party service account, respectively, the configuring including:
  providing, to the third-party service provider corresponding to the public account, an information obtaining interface that includes a subscription-based responding option; and
  in accordance with selection of the subscription-based responding option by an employee of the third-party service provider, obtaining, from a third-party server associated with the third-party service, one or more mapping relationships preset by the third party server, each of the mapping relationships corresponding to a mapping between a subscription-related operation of the third-party service provider and a response message; and
  configuring the set of auto-response rules in accordance with the mapping relationship;
 detecting a message sent by the user account associated with the terminal to the public account associated with the third-party service provider via the instant messaging service of the social networking application;
 identifying one or more keywords associated with the detected message;
 obtaining, according to the set of auto-response rules, a response message corresponding to the detected message, wherein the response message is preset by the third-party service provider and selected based on (i) the one or more parameters provided by the user account and (ii) the one or more keywords; and
 returning the obtained response message to the user account via the instant messaging service of the social networking application, wherein the obtained response message and the message sent by the user are displayed simultaneously on an instant messaging interface of the terminal.

9. The computer server according to claim 8, wherein:
 the set of auto-response rules includes a plurality of candidate response messages, each candidate response message being associated with one or more keywords; and
 obtaining the response message corresponding to the detected message comprises:
  querying the set of auto-response rules with the one or more keywords to identify one or more candidate response messages corresponding to the one or more keywords;
  ranking the identified one or more candidate response messages by the detected user event; and
  choosing one of the candidate response messages of a highest ranking as the obtained response message.

10. The computer server according to claim 8, wherein obtaining the response message corresponding to the detected message comprises:
 retrieving information from the Internet using the one or more keywords;
 supplementing one or more candidate auto response determined by the set of auto-response rules with the retrieved information as the response message corresponding to the detected social networking application message.

11. The computer server according to claim 8, wherein each auto-response rule defines a mapping relationship between a keyword in a social networking application message and a candidate response message, and obtaining the response message corresponding to the detected message comprises:
 identifying multiple candidate response messages corresponding to different keywords in the detected social networking application message; and
 compiling the multiple candidate response messages into one comprehensive response message as the response message corresponding to the detected social networking application message.

12. The computer server according to claim 8, wherein configuring the set of auto-response rules for the subscription relationship further comprises:
 providing, to the third-party service provider corresponding to the public account, a keyword setting interface for setting a mapping relationship between a keyword and a candidate response message; and
 obtaining a mapping relationship between a keyword and a response message from the keyword setting interface, wherein one keyword corresponds to at least one candidate response message.

13. The computer server according to claim 8, wherein obtaining the response message corresponding to the detected message comprises:
 sending a user event notification message to the third-party service provider according to the public account, wherein the user event notification message carries at least event information of the detected message;
 receiving a user event response message sent by the third-party service provider, wherein the user event response message carries a responding manner determined by the third-party service provider for the response message corresponding to the detected message, and the responding manner is determined by the third-party service provider according to the event information and a preset auto-response rule between a user event and a candidate response message; and
 generating the response message according to the responding manner.

14. The computer server according to claim 13, wherein the message is a message selected from the group consisting of: the terminal sending a text message to the public account associated with the third-party service provider, the terminal sending a multimedia message to the public account associated with the third-party service provider, and the terminal sending its current location to the public account associated with the third-party service provider.

15. A non-transitory computer readable storage medium in connection with a computer server having one or more processors, memory, and a plurality of programs stored in the memory, wherein the computer server hosts a social networking application that includes a plurality of social network user accounts, including a user account associated with a terminal and a public account associated with a third-party service provider, wherein the programs, when executed by the one or more processors, cause the computer server to perform operations comprising:

- receiving a subscription request from the terminal to subscribe to the public account, the subscription request including identification of the public account associated with the third-party service provider and the user account associated with the terminal;
- establishing a subscription relationship between the user account and the third-party service account on the social networking application, wherein the user account and the third-party service account are configured to exchange information using an instant messaging service on the social networking application through the subscription relationship;
- configuring a set of auto-response rules for the subscription relationship in accordance with one or more parameters provided by the user account and the third-party service account, respectively, the configuring including:
  - providing, to the third-party service provider corresponding to the public account, an information obtaining interface that includes a subscription-based responding option; and
  - in accordance with selection of the subscription-based responding option by an employee of the third-party service provider, obtaining, from a third-party server associated with the third-party service, one or more mapping relationships preset by the third party server, each of the mapping relationships corresponding to a mapping between a subscription-related operation of the third-party service provider and a response message; and
  - configuring the set of auto-response rules in accordance with the mapping relationship;
- detecting a message sent by the user account associated with the terminal to the public account associated with the third-party service provider via the instant messaging service of the social networking application;
- identifying one or more keywords associated with the detected message;
- obtaining, according to the set of auto-response rules, a response message corresponding to the detected message, wherein the response message is preset by the third-party service provider and selected based on (i) the one or more parameters provided by the user account and (ii) the one or more keywords; and
- returning the obtained response message to the user account via the instant messaging service of the social networking application, wherein the obtained response message and the message sent by the user are displayed simultaneously on an instant messaging interface of the terminal.

16. The non-transitory computer readable storage medium according to claim 15, wherein:

the set of auto-response rules includes a plurality of candidate response messages, each candidate response message being associated with one or more keywords; and obtaining, according to the set of auto-response rules, a response message corresponding to the detected message comprises:
- querying the set of auto-response rules with the one or more keywords to identify one or more candidate response messages corresponding to the one or more keywords;
- ranking the identified one or more candidate response messages by the detected user event; and
- choosing one of the candidate response messages of a highest ranking as the obtained response message.

17. The non-transitory computer readable storage medium according to claim 15, wherein obtaining the response message corresponding to the detected message comprises:
- retrieving information from the Internet using the one or more keywords;
- supplementing one or more candidate auto response determined by the set of auto-response rules with the retrieved information as the response message corresponding to the detected social networking application message.

18. The non-transitory computer readable storage medium according to claim 15, wherein each auto-response rule defines a mapping relationship between a keyword in a social networking application message and a candidate response message, and obtaining the response message corresponding to the detected message comprises:
- identifying multiple candidate response messages corresponding to different keywords in the detected social networking application message; and
- compiling the multiple candidate response messages into one comprehensive response message as the response message corresponding to the detected social networking application message.

* * * * *